US010579046B2

United States Patent
Atherton et al.

(10) Patent No.: US 10,579,046 B2
(45) Date of Patent: Mar. 3, 2020

(54) CLOSED-LOOP ROBOTIC DEPOSITION OF MATERIAL

(71) Applicant: AUTODESK, INC., San Rafael, CA (US)

(72) Inventors: Evan Atherton, San Carlos, CA (US); David Thomasson, Fairfax, CA (US); Maurice Ugo Conti, Muir Beach, CA (US); Heather Kerrick, Oakland, CA (US); Nicholas Cote, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 143 days.

(21) Appl. No.: 15/495,944

(22) Filed: Apr. 24, 2017

(65) Prior Publication Data

US 2018/0307206 A1 Oct. 25, 2018

(51) Int. Cl.
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/49007* (2013.01); *G05B 2219/49023* (2013.01)

(58) Field of Classification Search
CPC . B29C 67/0088; B33Y 50/02; G05B 19/4099; G05B 2219/49007; G05B 2219/49023
See application file for complete search history.

(56) References Cited

U.S. PATENT DOCUMENTS

| | | | | |
|---|---|---|---|---|
| 2015/0045928 A1* | 2/2015 | Perez | .................... | B29C 64/112 700/110 |
| 2015/0298153 A1* | 10/2015 | Baker | ..................... | B05B 12/12 438/7 |
| 2015/0336297 A1* | 11/2015 | Peters | ................. | B29C 33/3842 249/98 |
| 2016/0339646 A1* | 11/2016 | Baecker | ................ | B29C 64/141 |

(Continued)

OTHER PUBLICATIONS

Garcia, Nora Leiva, Path Correction for 3D Printing by Robotic Manipulator, Norwegian University of Science and Techonology, Jul. 2018 (accessed from <<https://ntnuopen.ntnu.no/ntnu-xmlui/bitstream/ handle/11250/2560564/18721_FULLTEXT.pdf?sequence=1 >> on Oct. 9, 2019) (Year: 2018).*

*Primary Examiner* — Michael J Huntley
(74) *Attorney, Agent, or Firm* — Artegis Law Group, LLP

(57) ABSTRACT

A robot system is configured to fabricate three-dimensional (3D) objects using closed-loop, computer vision-based control. The robot system initiates fabrication based on a set of fabrication paths along which material is to be deposited. During deposition of material, the robot system captures video data and processes that data to determine the specific locations where the material is deposited. Based on these locations, the robot system adjusts future deposition locations to compensate for deviations from the fabrication paths. Additionally, because the robot system includes a 6-axis robotic arm, the robot system can deposit material at any locations, along any pathway, or across any surface. Accordingly, the robot system is capable of fabricating a 3D object with multiple non-parallel, non-horizontal, and/or non-planar layers.

20 Claims, 29 Drawing Sheets

(56) References Cited

U.S. PATENT DOCUMENTS

| | | | |
|---|---|---|---|
| 2017/0057170 A1* | 3/2017 | Gupta | B29C 67/0088 |
| 2017/0232680 A1* | 8/2017 | Skogsrud | G05B 19/4099 |
| | | | 425/140 |
| 2017/0239721 A1* | 8/2017 | Buller | B29C 64/40 |
| 2018/0093420 A1* | 4/2018 | Roberts | B29C 64/106 |
| 2018/0297113 A1* | 10/2018 | Preston | B22F 3/008 |

* cited by examiner

CLOSED-LOOP ROBOTIC DEPOSITION OF MATERIAL

BACKGROUND OF THE INVENTION

Field of the Invention

Embodiments of the present invention relate generally to robotics and, more specifically, to closed-loop robotic deposition of material.

Description of the Related Art

A three-dimensional (3D) printer is a device for fabricating real-world 3D objects based on simulated 3D models. A software application executing on a computer system typically interfaces with the 3D printer and coordinates all aspects of printing, including processing the 3D models and issuing printing commands to the 3D printer.

To fabricate a 3D object, the software application first processes the 3D model to generate a set of slices. Each "slice" is a different two-dimensional (2D) cross-section of the 3D model. The software application generates each slice by computing the intersection between a 2D plane and the 3D model at a specific depth along a vertical axis associated with the 3D model. A given slice thus indicates a set of X, Y, Z coordinates where the 3D model occupies space. For a particular X, Y, Z coordinate, the Z coordinate indicates the height of the slice, while the X and Y coordinates indicate a planar location within the slice. As a general matter, each slice in the set of slices is substantially horizontal and also substantially parallel to an adjacent slice. Taken as a whole, the set of slices represents the overall topology of the 3D object to be fabricated and indicates the volume of material needed to print the 3D object.

After generating the set of slices, the software application configures the 3D printer to iteratively deposit material based on the X, Y, Z coordinates included within each slice. Specifically, the 3D printer deposits material one slice at a time at the particular X, Y, Z coordinates where the 3D object occupies space. The material deposited across all X, Y, Z coordinates associated with a given slice forms a layer of material that resembles each slice. Material for each subsequent layer is deposited on top of a previous layer and substantially parallel to that previous layer. When the 3D printer has deposited material for all slices, the 3D object is complete. Although 3D printing has revolutionized fabrication of 3D objects, the fundamental approach described above suffers from two primary drawbacks.

First, conventional 3D printers and corresponding software applications operate in a strictly open-loop capacity and therefore are not able to respond to feedback. Consequently, conventional 3D printers and the associated software applications typically cannot tolerate faults, deviations, or other unforeseen events that may arise or be experienced during the printing process. For example, suppose a thermoplastics 3D printer were to deposit a bead of material that had a density that exceeded the expected density for the material. Because of the higher density, the bead would take longer than expected to harden, which would then cause one or more subsequent layers of material to be deposited incorrectly when printed. Accordingly, when the 3D object completed printing, the object would sag near the location of the bead and appear shorter than expected.

Second, conventional 3D printers are mechanically constrained and can deposit material only in substantially parallel, horizontal layers. Consequently, conventional 3D printers cannot fabricate 3D objects having certain types of geometry. For example, a conventional 3D printer would not be able to easily fabricate a 3D object with an extended overhanging portion, because the overhanging portion would lack physical support from any underlying layers of material.

As the foregoing illustrates, what is needed in the art are more effective techniques for fabricating 3D objects.

SUMMARY OF THE INVENTION

Various embodiments of the present invention set forth a computer-implemented method for fabricating a three-dimensional (3D) object, including causing a deposition tool to deposit a first portion of material proximate to a first target location, determining a first distance from the first portion of material to the first target location, updating a second target location based on the first distance to generate an updated second target location, and causing the deposition tool to deposit a second portion of material proximate to the updated second target location.

At least one advantage of the techniques described herein is that the robot is capable of tolerating and compensating for a wide variety of potential faults, thereby increasing the likelihood of fabricating a 3D object that meets design specifications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
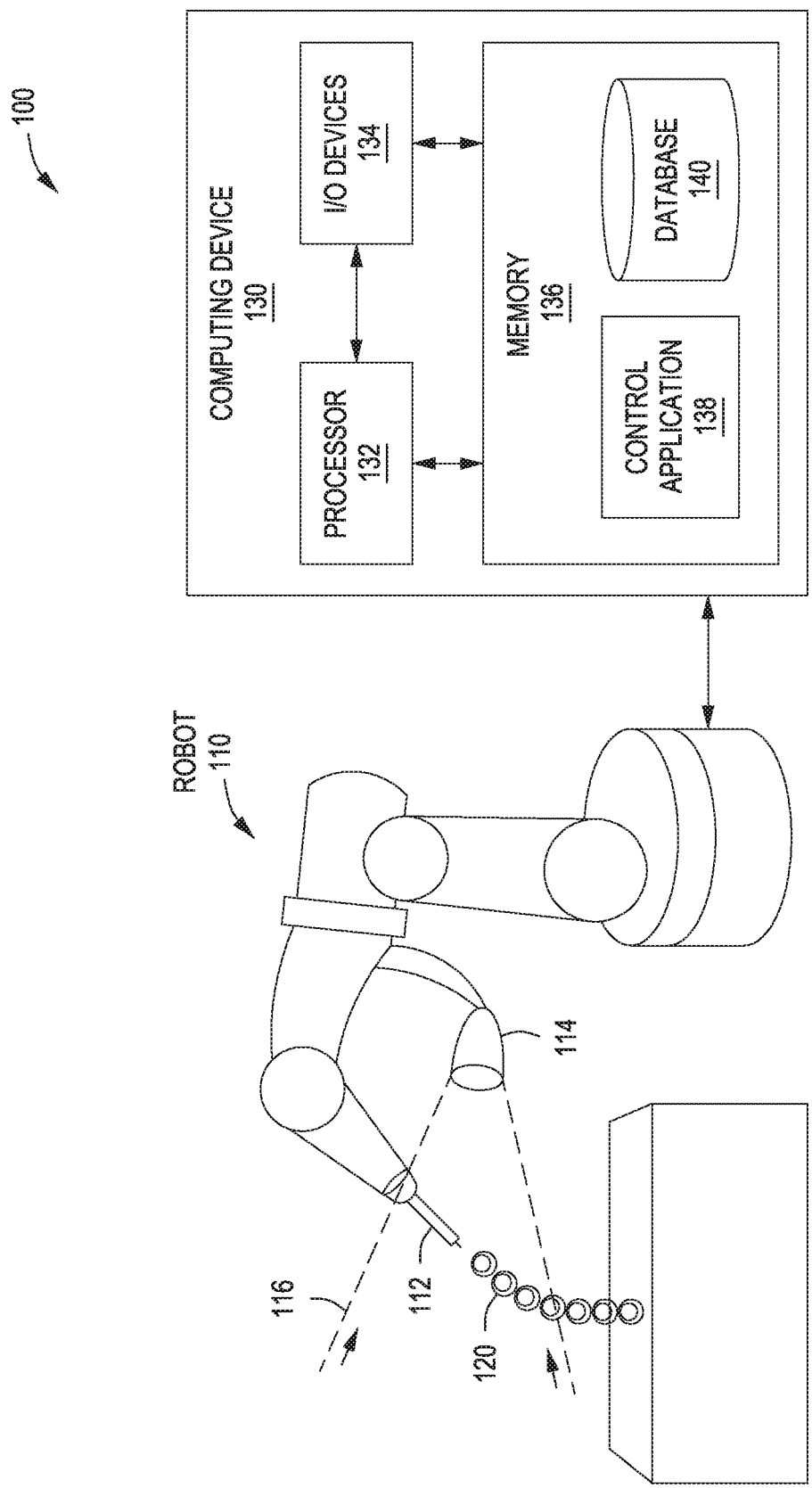
FIG. 1 illustrates a system configured to implement one or more aspects of the present invention.

FIG. 1 illustrates a system configured to implement one or more aspects of the present invention. As shown, a robot system 100 includes a robot 110 configured to generate a three-dimensional (3D) object 120. Robot 110 may be any technically feasible type of robot capable of operating in three dimensions. In the embodiment shown in FIG. 1, robot 110 is a 6-axis robotic arm. Robot 110 includes a deposition tool 112 and an optical device 114.

Deposition tool 112 may be any technically feasible implement configured to output material, including a fused deposition nozzle, a fused filament device, a welder, and so forth. Deposition tool 112 is configured to deposit material onto 3D object 120 to fabricate 3D object 120. In the embodiments discussed herein, deposition implement 112 is a metal inert gas (MIG) welder configured to deposit weld beads in order to fabricate 3D object 120. Optical device 114 is a sensor configured to capture frames of video data related to the deposition process performed by deposition tool 112. In practice, optical device 114 is a video camera, although other types of sensors fall within the scope of the present invention, including audio sensors, among others. In one embodiment, optical device 114 is a laser scanner configured to generate a 3D point cloud of geometry data.

Robot 110 is coupled to a computing device 130. In operation, computing device 130 receives various data signals from robot 110, including feedback signals, sensor signals, and so forth, and then processes those signals to generate commands for controlling robot 110. Computing device 130 transmits the commands to robot 110 to cause robot 110 to fabricate 3D object 120. Computing device 130 includes a processor 132, input/output (I/O) devices 134, and a memory 136, as shown.

Processor 132 may be any technically feasible form of processing device configured process data and execute program code. Processor 132 could be, for example, a central processing unit (CPU), a graphics processing unit (GPU), an application-specific integrated circuit (ASIC), a field-programmable gate array (FPGA), any technically feasible combination of such units, and so forth.

I/O devices 134 may include devices configured to receive input, including, for example, a keyboard, a mouse, and so forth. I/O utilities 134 may also include devices configured to provide output, including, for example, a display device, a speaker, and so forth. I/O utilities 134 may further include devices configured to both receive and provide input and output, respectively, including, for example, a touchscreen, a universal serial bus (USB) port, and so forth.

Memory 136 may include any technically feasible storage medium configured to store data and software applications. Memory 136 could be, for example, a hard disk, a random access memory (RAM) module, a read-only memory (ROM), and so forth. Memory 126 includes a control application 138 and a database 140. Control application 138 is a software application that, when executed by processor 132, implements a closed-loop control process that is described in greater detail below in conjunction with FIG. 2.

Figure 2:
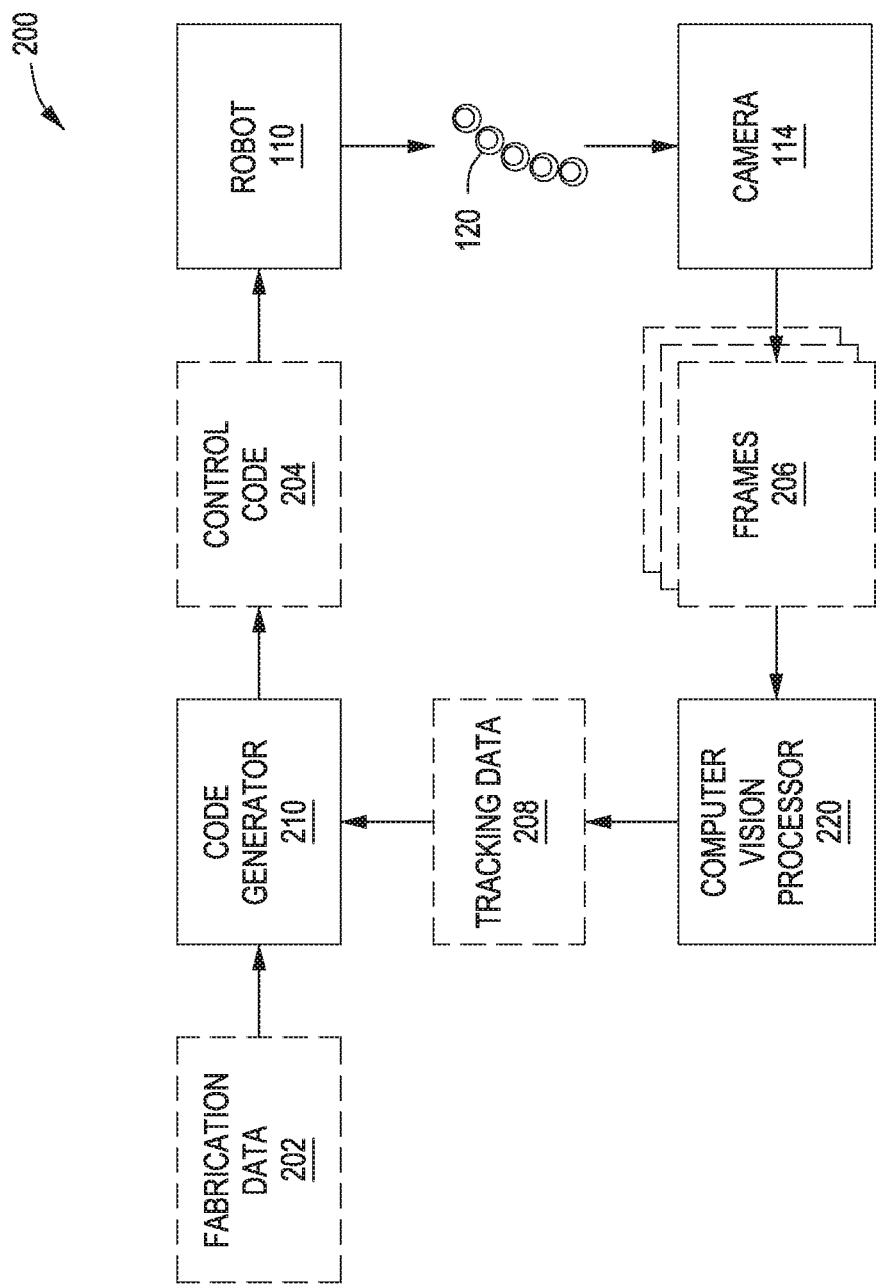
FIG. 2 illustrates various data and processing stages implemented by the control application of FIG. 1, according to various embodiments of the present invention.

FIG. 2 illustrates various data and processing stages implemented by the control application of FIG. 1, according to various embodiments of the present invention. As shown, a closed-loop control process 200 includes a code generator 210, robot 110, 3D object 120, optical device 114, and computer vision processor 220.

Before fabrication begins, code generator 210 receives fabrication data 202. Fabrication data 202 defines 3D object 120 and/or defines a procedure for generating 3D object. For example, fabrication data 202 could include a 3D model of 3D object 120. Alternatively, fabrication data 202 could include a set of guide curves that robot 110 would follow during the deposition process in order to fabricate 3D object 120. Code generator 210 processes fabrication data 202 to generate control code 204. Control code 204 generally specifies various actions for robot 110 to perform, and specifically indicates a set of target locations where robot 110 should deposit material. For example, control code 204 could include G-code for performing different operations as well as a set of X, Y, Z coordinates where robot 110 should deposit weld beads.

During fabrication, robot 110 executes control code 204 to perform material deposition on 3D object 120. Simultaneously, optical device 114 captures real-time video of that material deposition to generate frames 206 of video data. Computer vision processor 220 processes these frames to generate tracking data 208. Computer vision processor 220 implements a technique known in the art as "template matching" to track specific locations on 3D object 120 where robot 110 deposits material. Computer vision processor 220 includes these locations in tracking data 208 and transmits this data to code generator 210.

Code generator 210 processes tracking data 208 and compares the specific locations where robot 110 deposited material to the set of target locations where robot 110 was instructed to deposit material. Code generator 210 analyzes the difference between each deposition location and the corresponding target location, and then updates control code 204 to compensate for those differences. In practice, numerous factors may prevent robot 110 from depositing material at the precise target locations set forth in control code 204. For example, robot 110 and/or deposition tool 112 could be subject to process-voltage-temperature (PVT) variations, including those related to material impurities, voltage surges, heating or cooling inconsistencies, and so forth.

FIGS. 3-9 describe in greater detail various techniques that robot system 100 implements in order to fabricate 3D objects.

Fabricating 3D Objects

Figure 3:
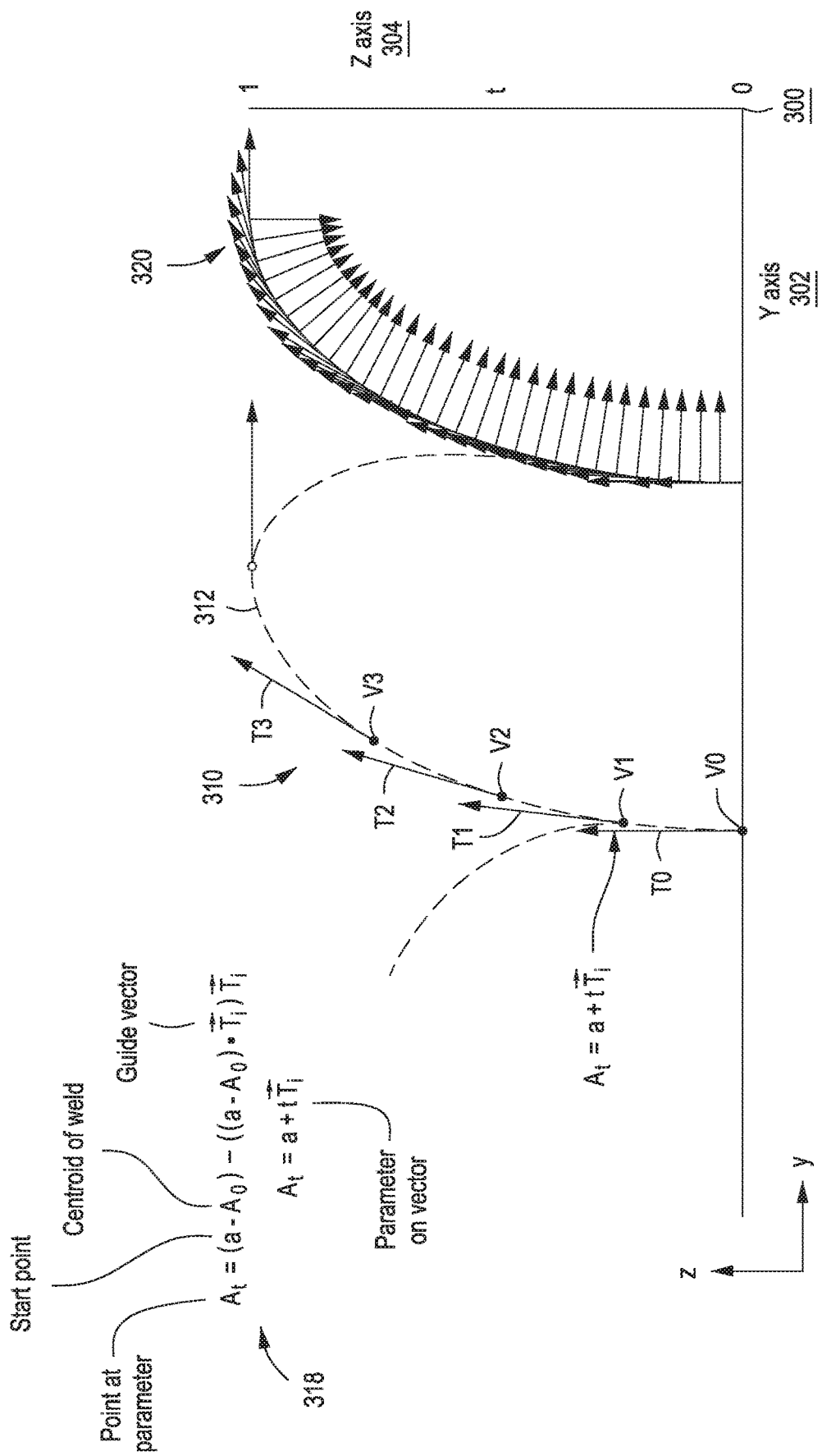
FIG. 3 illustrates a guide curve along which the robot system of FIG. 1 deposits material, according to various embodiments of the present invention.

FIG. 3 illustrates a guide curve along which the robot system of FIG. 1 deposits material, according to various embodiments of the present invention. As shown, a plot 300 includes a Y axis 302 and a Z axis 304. Plot 300 includes exemplary fabrication data 310 that includes a guide curve 312. Guide curve 312 indicates a fabrication pathway that robot 110 should follow during material deposition. Vertices V0, V1, V2 and V3 are disposed at intervals along guide curve 312. Each vertex is a target location where robot 110 should deposit material. Tangent vectors T0, T1, T2, and T3 are also disposed along guide curve 312 and associated with vertices V0, V1, V2, and V3, respectively. Each tangent vector is tangent to guide curve 312 at the corresponding vertex. Robot system 110 is configured to generate the set of vertices and tangent vectors based on fabrication data 310 and/or update those vertices and vectors based on real-time feedback. Robot system 110 may then generate or update control code 204 for robot 110 by processing these vertices and tangent vectors to compensate for deviations from guide curve 312. This approach is illustrated in FIG. 3 in contrast to a conventional approach 320, where layer upon layer of material is deposited without applying any compensation.

In one embodiment, robot system 100 implements equation 318 to successively generate vertices and tangent vectors during fabrication. To generate a given vertex, robot system compares a previous deposition location to the target location associated with that deposition location. Robot system 100 may rely on computer vision processor 220 to determine the previous deposition locations, as described above. Then, robot system 100 corrects a subsequent target location based on the difference between the previous deposition location and the corresponding target location.

More specifically, to evaluate equation 314, robot system 100 adds to point a, a Vector, T, that has been scaled by a parameter, t or ti. The result of the bottom portion of equation 318 is, therefore, local to a and in order to drive robot 110 must be re-located with respect to the origin, A0; the second term of equation 318 effects this relocation. Once a suitable pixel location is found for the next weld, robot system 100 finds the next closest pixel location, At, and parameter, ti+1, along the guide curve. This repeats until the guide curve has been printed or becomes irrelevant, at which time the next guide curve in a sequence is used. Although equation 318 is vector based, any parametric equation for a circle, curve, and so forth falls within the scope of the invention. This approach is described in greater detail below in conjunction with FIG. 4.

Figure 4:
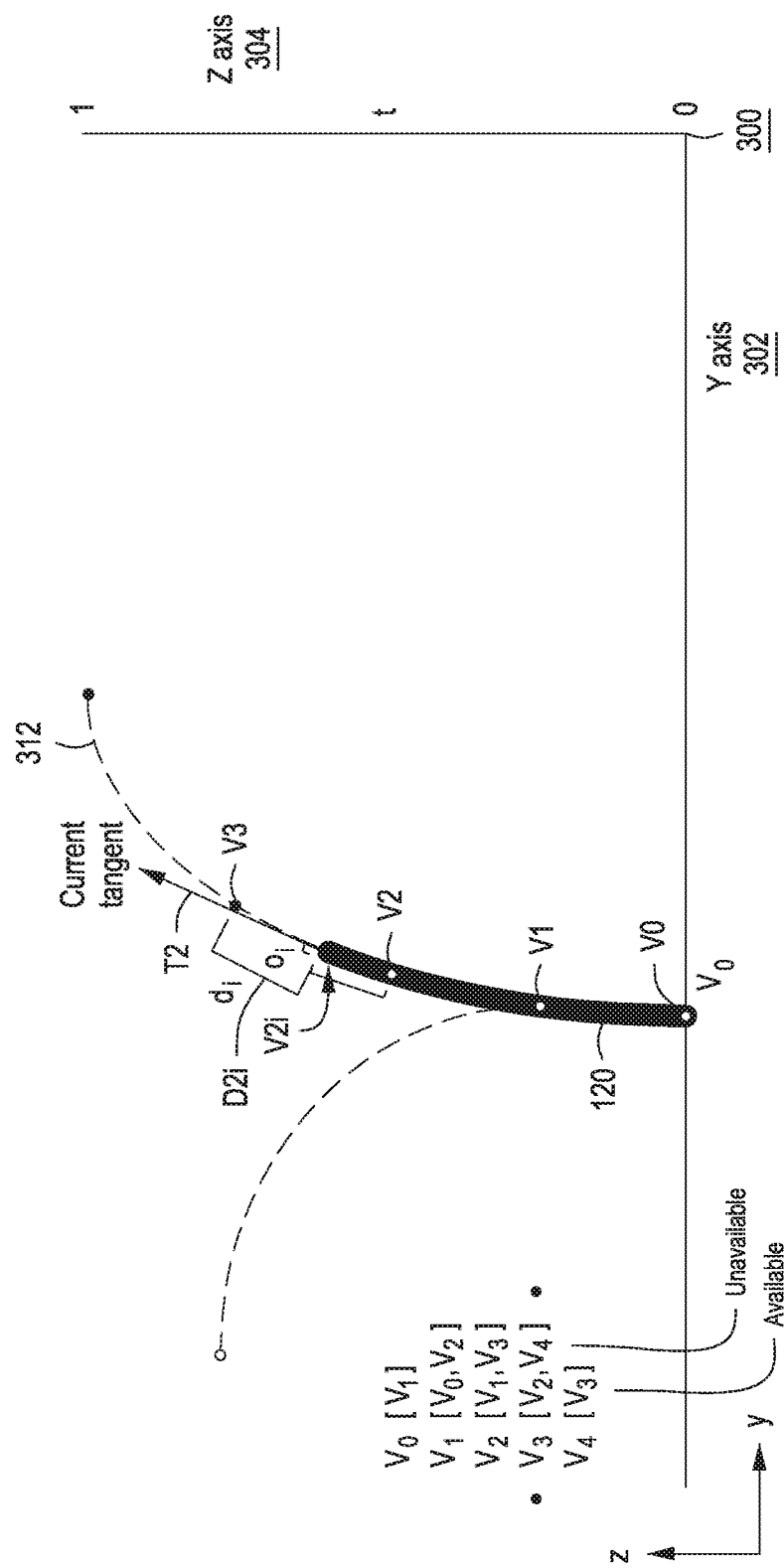
FIG. 4 is a more detailed illustration of the guide curve of FIG. 3, according to various embodiments of the present invention.

FIG. 4 is a more detailed illustration of the guide curve of FIG. 3, according to various embodiments of the present invention. As shown, the deposition of material onto 3D object 120 generally follows guide curve 312. In particular, robot 110 is configured to deposit material at discrete locations between vertices V0 through V3 in a manner that causes 3D object 120 grow along a smooth pathway between those vertices.

In embodiments where deposition tool 112 is a MIG welder, robot system 100 may deposit a sequence of weld beads at target locations that reside between adjacent vertices, thereby interpolating between vertices. In doing so, robot system 100 tracks the deposition location of each weld bead using the computer vision techniques described above. For a given weld bead, robot system 100 computes the distance between the weld bead and a subsequent vertex, and then adjusts intermediate target locations to progress towards that subsequent vertex. As shown, robot system 100 determines weld bead location V2$i$ and distance between V2$i$ and the subsequent vertex, V3. Robot system 100 may then adjust one or more target locations that reside between V2$i$ and V3 so that upon reaching V3, robot system 100 deposits a weld bead proximate to V3. In this manner robot system 100 follows guide curve 312.

Figure 5:
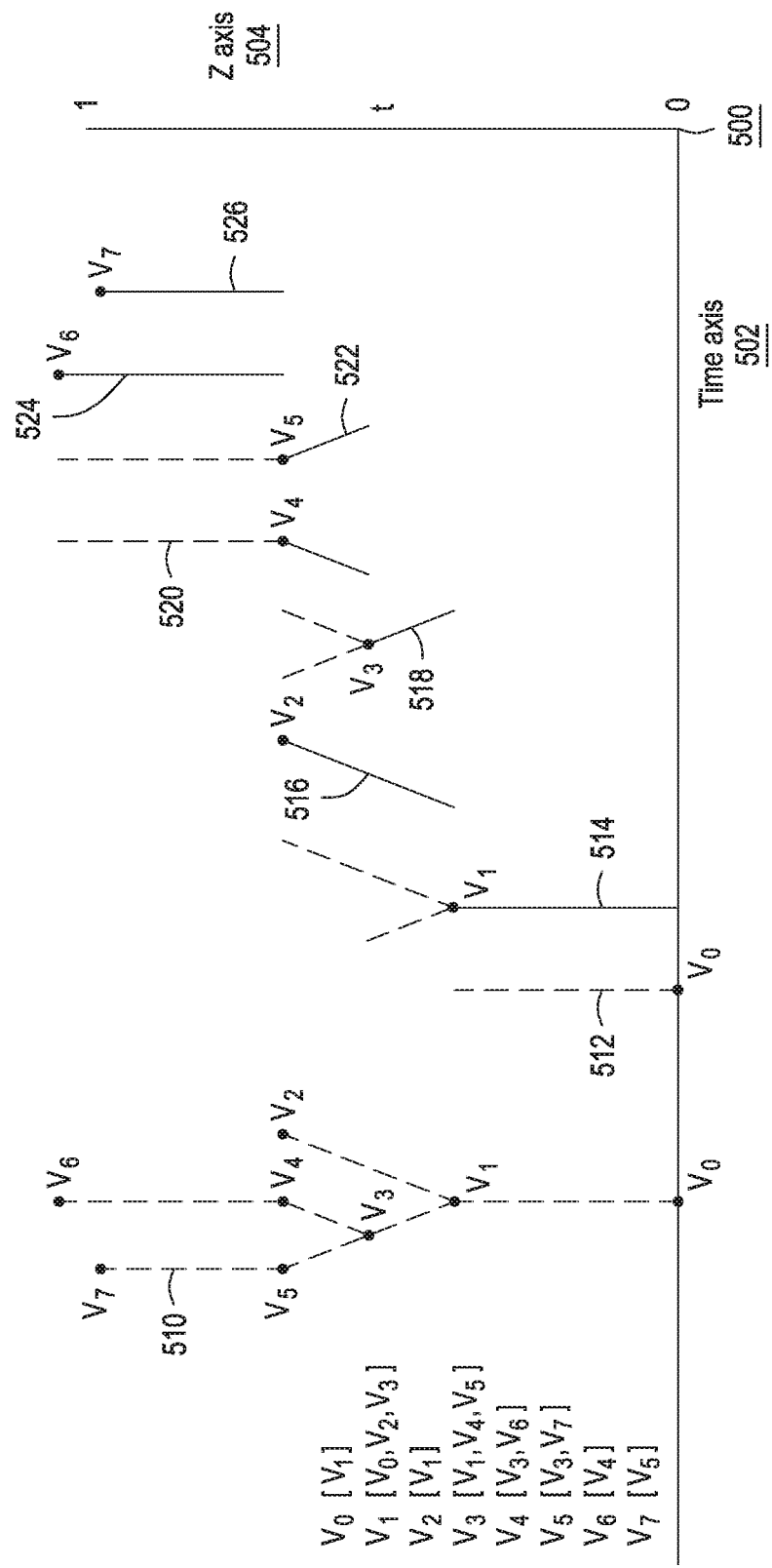
FIG. 5 illustrates a deposition plan the robot system of FIG. 1 executes to fabricate branched structures, according to various embodiments of the present invention.
Figure 6:
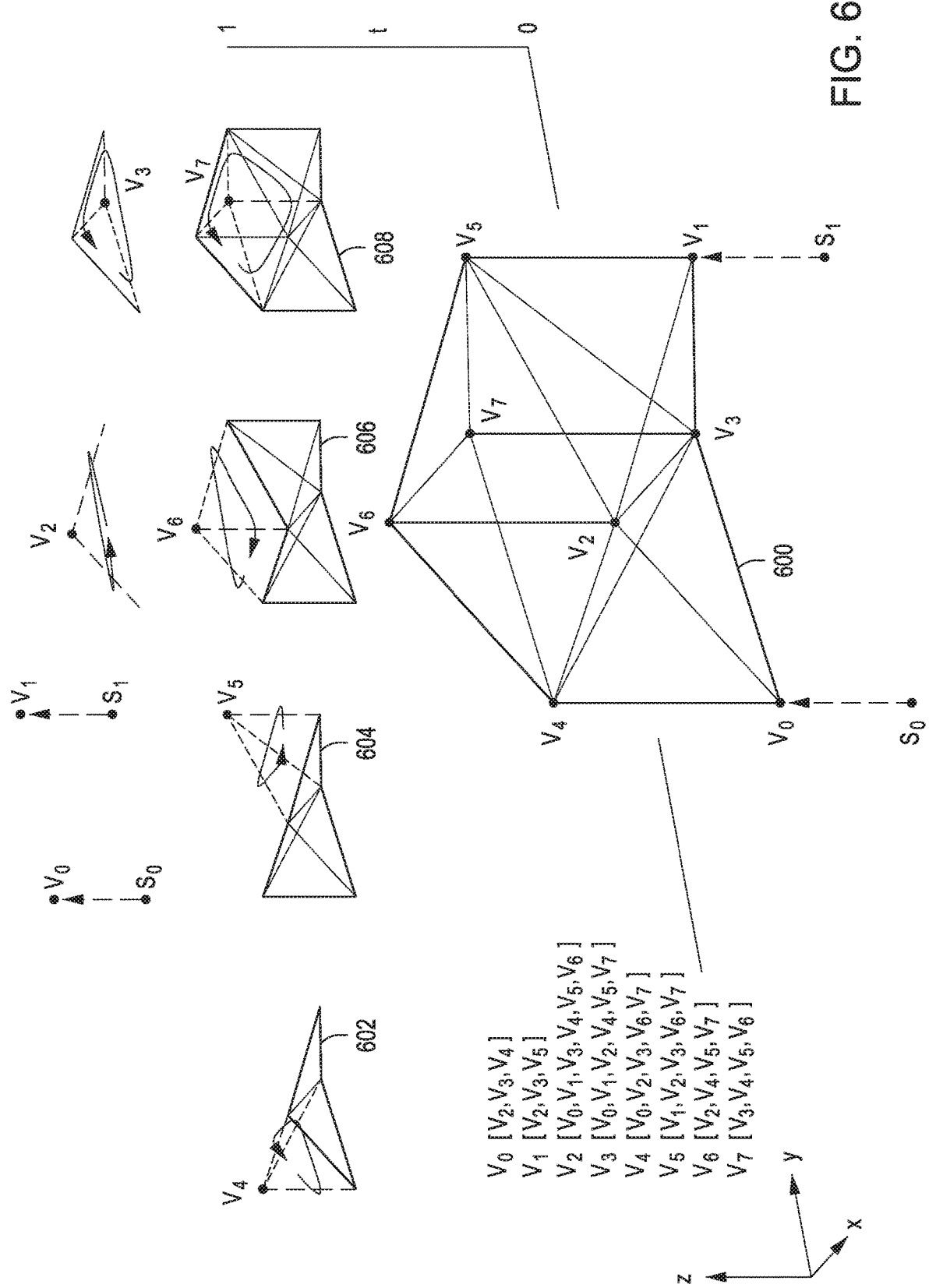
FIGS. 6 and 7 illustrate how the robot system of FIG. 1 follows a deposition plan to fabricate a truss structure, according to various embodiments of the present invention.
Figure 7:
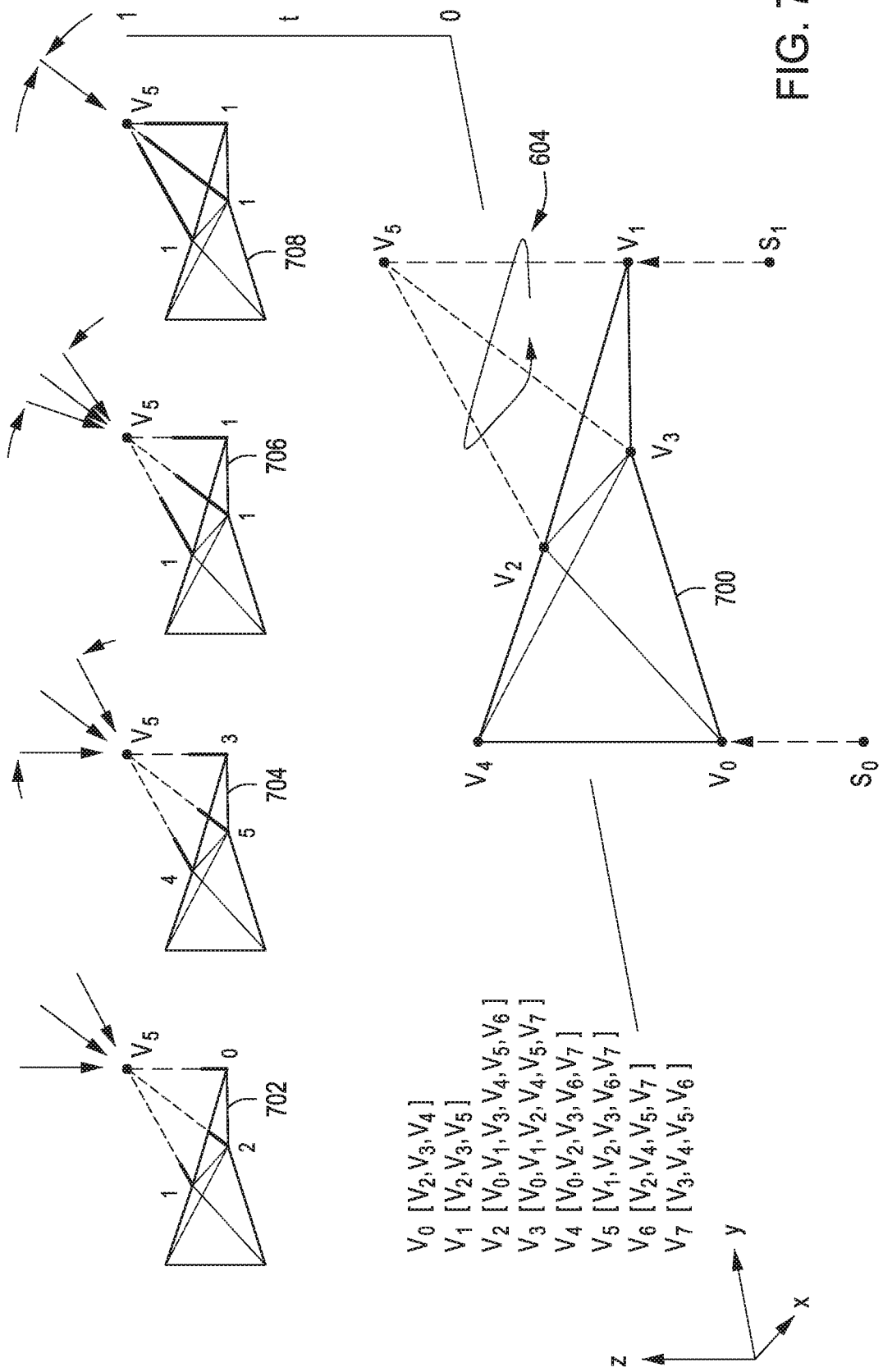

The above techniques may be implemented with any technically feasible type of deposition tool and with any technically feasible technique for tracking deposition locations. For example, deposition tool 112 could be a fused-deposition modeling nozzle that ejects plastic filaments, while optical device 114 could be an infrared sensor configured to track heat signatures. With any such approach, robot system 100 is capable of fabricating highly complex structures due, at least in part, to having six degrees of freedom. Furthermore, robot system 100 is capable of fabricating such structures with a high degree of accuracy because of the closed-loop deposition technique described thus far. FIGS. 5-7 discuss how robot system 100 fabricates branched structures such as 3D trusses.

FIG. 5 illustrates a deposition plan the robot system of FIG. 1 executes to fabricate branched structures, according to various embodiments of the present invention. As show, timeline 500 includes deposition plan 510 displayed against time axis 502 and Z axis 504. Deposition plan 510 indicates a set of vertices V0, V1, V2, V3, V4, V5, V6, and V7 at which robot system 100 should deposit material in order to generate 3D object 120. In addition, deposition plan 510 also indicates structural relationships between those vertices. For example, deposition plan 510 indicates that V0 is connected to V1, V1 is connected to V2 and V3, V3 is connected to V4 and V5, and V4 and V5 are connected to V6 and V7, respectively. Each such connection may be associated with a different guide curve that mathematically describes a fabrication pathway for robot system 100 to follow during deposition. Code generator 210, discussed above in conjunction with FIG. 2, is configured to generate deposition plan 510 when translating fabrication data 202 into control code 204.

As also shown, deposition plan 510 is broken down into separate branches. Branch 512 defines a connection between V0 and V1. Branch 514 includes branch 512 and other branches that connect V1 to V2 and V3. Branch 516 defines a connection between V1 and V2, while branch 518 defines a connection between V1 and V3. Branch 518 includes a portion of branch 514 and also includes other branches that connect V3 to V4 and V5. Branch 520 defines a connection between V3 and V4 and also includes another branch that connects V4 and V6. Branch 522 defines a connection between V3 and V5 and also includes another branch that connects V5 to V7. Branch 524 defines the connection between V4 and V6, while branch 526 defines the connection between V5 and V7.

In order to execute deposition plan 510, robot system 100 progresses sequentially from each vertex to a subsequent vertex and fabricates a connection between those vertices in the order shown. In doing so, robot system 100 follows the particular guide curve associated with each respective connection. One advantage of the deposition plan shown is that robot system 100 may avoid collisions between deposition tool 112 and portions of 3D object 120 during fabrication. When generating deposition plan 510, code generator 210 may implement any technically feasible optimization algorithm to maximize the efficiency with which robot system 100 fabricates 3D object 120, including path optimization techniques, among others.

Robot system 100 executes deposition plans such as that shown here in order to generate complex structures such as trusses, as described by way of example below in conjunction with FIGS. 6-7.

FIG. 6 illustrates an example of how the robot system of FIG. 1 follows a deposition plan to manufacture a truss structure, according to various embodiments of the present invention. As shown, truss 600 includes vertices V0 through V7. In order to fabricate truss 600, robot system 100 executes a deposition plan that involves fabricating truss members sequentially for different truss portions. In particular, to generate truss portion 602, robot system 100 fabricates truss members connecting V0, V2, and V3 to V4. To generate truss portion 604, robot system 100 fabricates truss members connecting V1, V2, and V3 to V5. To generate truss portion 606, robot system 100 fabricates truss members connecting V2, V4, and V5 to V6. Finally, to generate truss portion 608, robot system 100 fabricates truss members connecting V3, V4, and V5 to V7.

Robot system 100 may implement a particular technique for generating each such truss portion that is described in greater detail below in conjunction with FIG. 7.

FIG. 7 illustrates in greater detail the example of FIG. 6, according to various embodiments of the present invention. As shown, to generate truss portion 604, robot system performs a sequence of deposition circuits. For each deposition circuit, robot system 100 completes a set of passes. In particular, to perform deposition circuit 704, robot system 100 completes passes 0, 1, and 2 to deposit material for the respective truss members connected to V5. To perform deposition circuit 706, robot system 100 completes passes 3, 4, and 5 to deposit additional material to those truss members. To perform deposition circuit 708, robot system 100 completes passes 6, 7, and 8 to deposit additional material. Finally, to perform deposition circuit 708, robot system 100 completes passes 9, 10, and 11.

In this manner, robot system 100 builds up the various truss members associated with truss portion 604. In some embodiments, robot system 100 may complete each truss member before proceeding to another truss member, thereby performing just one circuit where each truss member is fabricated completely before proceeding to a subsequent truss member. The approach set forth herein may be defined within deposition plan 510 discussed above in conjunction with FIG. 5. In addition, robot system 100 generally performs the compensation techniques described above in conjunction with FIGS. 3 and 4 in order to generate truss members that follow guide curves defined in fabrication data 202.

The various approaches discussed thus far are also described below in stepwise fashion in conjunction with FIGS. 8-9.

Figure 8:
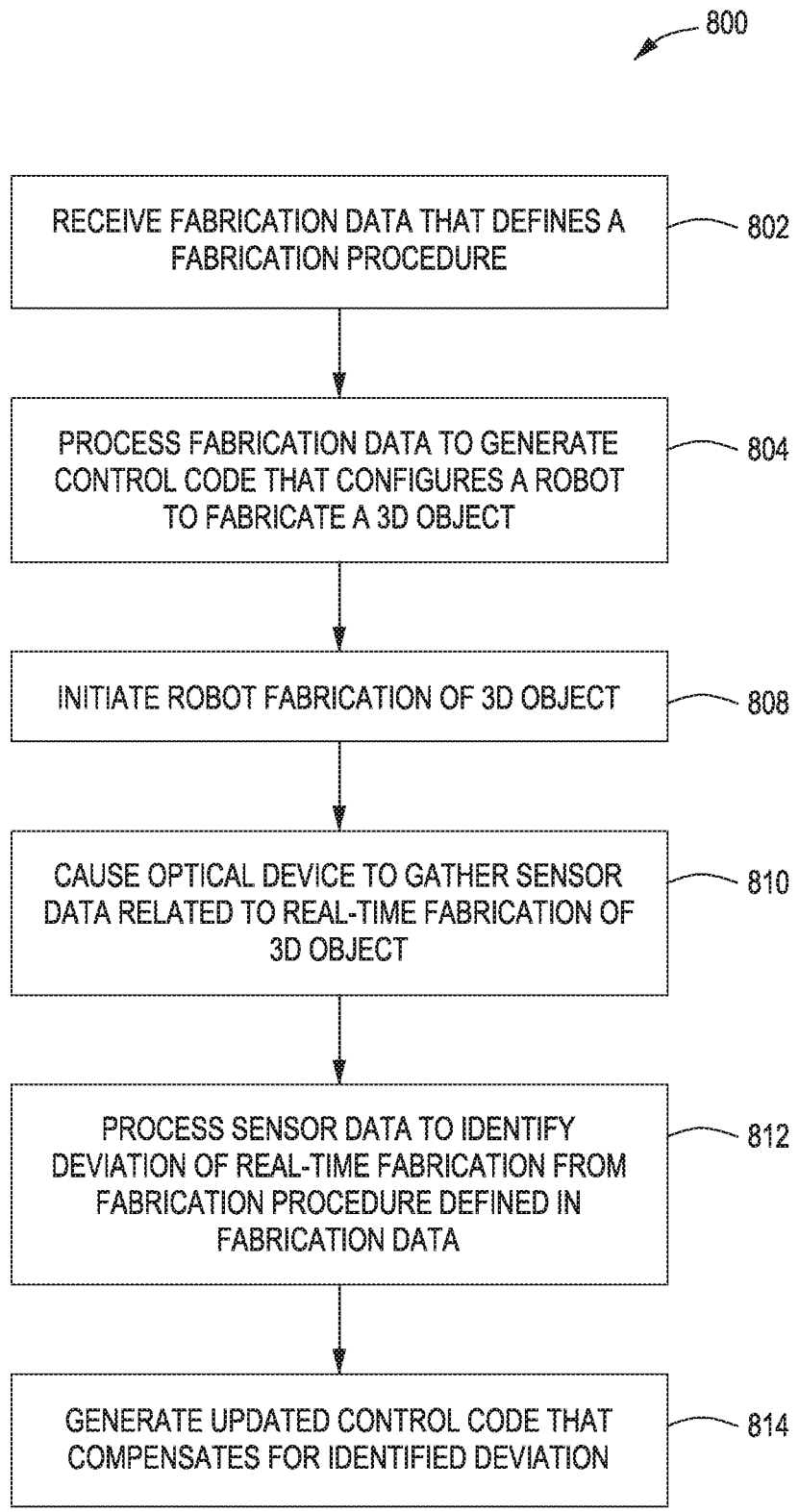
FIG. 8 is a flow diagram of method steps for fabricating a 3D object via a closed-loop control process, according to various embodiments of the present invention.

FIG. 8 is a flow diagram of method steps for fabricating a 3D object via a closed-loop control process, according to various embodiments of the present invention. Although the method steps are described in conjunction with the systems of FIGS. 1-7, persons skilled in the art will understand that any system configured to perform the method steps, in any order, is within the scope of the present invention.

As shown, a method 800 begins at step 802, where code generator 210 within closed-loop control process 200 of robot system 100 receives fabrication data 202. Fabrication data 202 may define a 3D geometry associated with 3D object 120 and/or a set of fabrication paths according to which robot system 100 may deposit material to generate 3D object 120. At step 804, code generator 210 generates control code 204 that configures robot 110 to generate 3D object 120. Control code 204 may include G-code or other commands for performing material deposition. At step 806, robot 110 begins depositing material via deposition tool 112 based on control code 204.

At step 808, robot system 100 causes optical device 114 to gather optical data representing real-time fabrication of 3D object 120. That optical data may include frames 206 of video data and/or point cloud data gathered via laser scanner. In some embodiments, robot system 100 also gathers other types of data, including acoustic or vibrational data that represents the fabrication process. At step 810, computer vision processor 220 within closed-loop control process 200 of robot system 100 processes the optical data gathered at step 808 to determine one or more locations where robot 110 deposited material onto 3D object 120. Code generator 210 processes these locations to identify deviation of real-time fabrication from the fabrication procedure defined in fabrication data 202. In embodiments where optical device 114 is a laser scanner, code generator 210 fits point cloud data generated via that laser scanner to a model of 3D object 120 using an iterative closest-point algorithm, and then evaluates deviations based on differences between the point cloud and the model. In evaluating these deviations, code generator 210 may train an artificial neural network to correlate system-level parameters, such as material feedrate and voltage load, to particular types of deviations. Then, code generator 210 may anticipate deviations and preemptively compensate accordingly.

At step 812, code generator 210 then generates updated control code 204 that compensates for these deviations. Deviations of this variety may occur due to PVT variations, among other sources of uncertainty. In performing the general approach discussed in conjunction with FIG. 8, robot system 100 may generate complex branched structures, as described in greater detail below in conjunction with FIG. 9.

Figure 9:
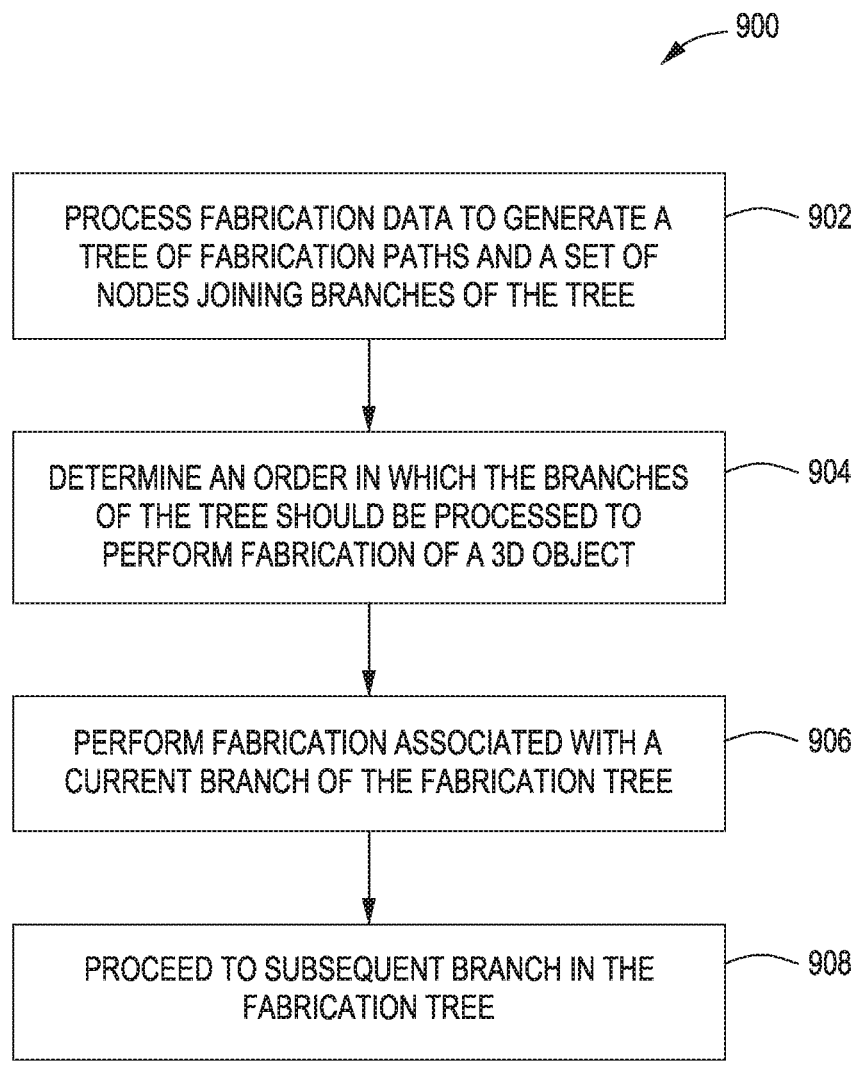
FIG. 9 is a flow diagram of method steps for fabricating a branched structure based on a set of guide curves, according to various embodiments of the present invention.

FIG. 9 is a flow diagram of method steps for fabricating a branched structure based on a set of guide curves, according to various embodiments of the present invention. Although the method steps are described in conjunction with the systems of FIGS. 1-7, persons skilled in the art will understand that any system configured to perform the method steps, in any order, is within the scope of the present invention.

As shown, a method 900 begins at step 902, where code generator 210 within closed-loop control process 200 of robot system 100 processes fabrication data 202 to generate a tree of fabrication paths and a set of nodes joining branches of the tree. Each node in the set of nodes is a vertex where robot system 100 should deposit material when fabricating 3D object 120. The fabrication paths between nodes are guide curves along which robot system 100 should deposit material. Deposition plan 510 of FIG. 5 is one example of a fabrication tree.

At step 904, code generator 210 determines an order with which the branches of the fabrication tree should be processed to perform fabrication of 3D object 120. Code generator 210 generally determines the processing order of fabrication tree branches so that material is deposited in an upward direction and without causing collisions between robot 110 and portions of 3D object 120.

At step 906, robot system 110 performs fabrication of a current branch of the fabrication tree. Upon completion of the current branch, robot system 110 advances to step 908 and proceeds to a subsequent branch in the fabrication tree.

Referring generally to FIGS. 8-9, robot system 100 is configured to implement the methods 800 and 900 in conjunction with one another in order to perform closed-loop fabrication of complex branched structures. In doing so, robot system 100 may implement a wide variety of computer vision processing techniques in order to track the deposition of material onto 3D object 120. FIGS. 10-21 describe some of these techniques in greater detail.

Tracking Weld Beads with Computer Vision

As a general matter, FIGS. 10-21 are directed toward embodiments of robot system 110 where deposition tool 112 is a welder configured to deposit weld beads onto 3D object 120 during fabrication. However, those skilled in the art will understand that the techniques described herein can be adapted to other types of material deposition as well.

Figure 10:
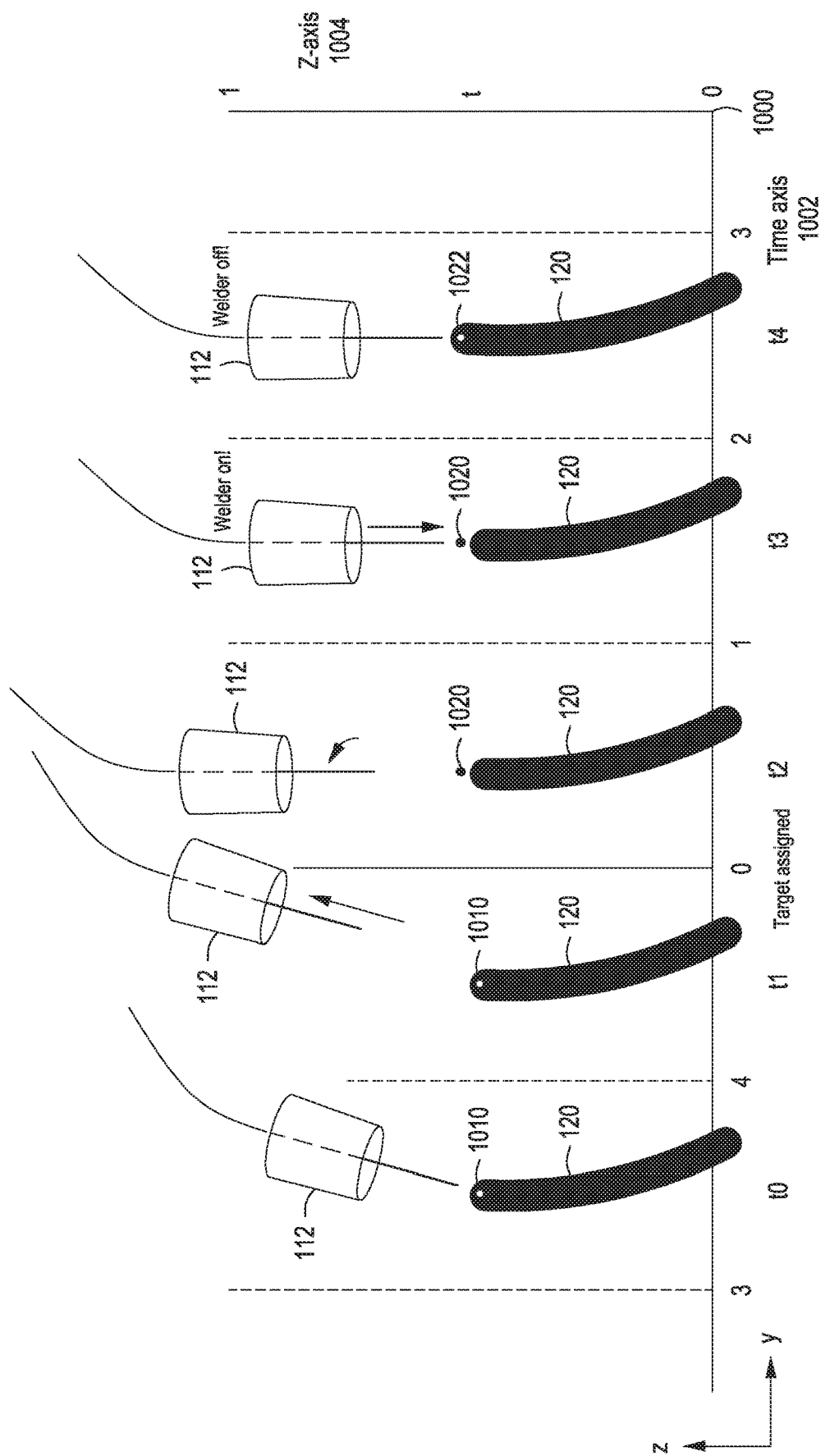
FIG. 10 illustrates how the robot system of FIG. 1 deposits a weld bead at a target location, according to various embodiments of the present invention.

FIG. 10 illustrates how the robot system of FIG. 1 deposits a weld bead at a target location, according to various embodiments of the present invention. As shown, at time t0 robot system 100 causes deposition tool 112 to deposit weld bead 1010 onto 3D object 120. In the embodiment shown, deposition tool 112 is a MIG welder feeding out wire to generate weld beads. At time t1, robot system 100 causes deposition tool 112 to retract, thereby allowing weld bead 1010 to cool. At time t2, robot system 100 determines the location of weld bead 1010 on 3D object 120 and then computes a target position 1020 for a subsequent weld bead. In doing so, robot system 100 compensates for any divergence between the target location for weld bead 1010 and the actual location where weld bead 1010 is deposited. At time t3, robot system 100 causes deposition tool 112 to begin welding proximate to target location 1020.

At time t4, robot system 100 completes welding, thereby generating weld bead 1022. Weld bead 1022 may reside at or near target location 1020.

During the process described above, robot system 100 continuously captures frames 206 of video data that depict the deposition of weld beads onto 3D object 120. Robot system 100 processes frames 206 to determine specifically where weld beads are deposited, and more generally, how closely the growth of 3D object 120 aligns with target geometry for 3D object 120 defined in fabrication data 202. Robot system 100 may then compensate for deviations from that target geometry, as described in greater detail below in conjunction with FIG. 11.

Figure 11:
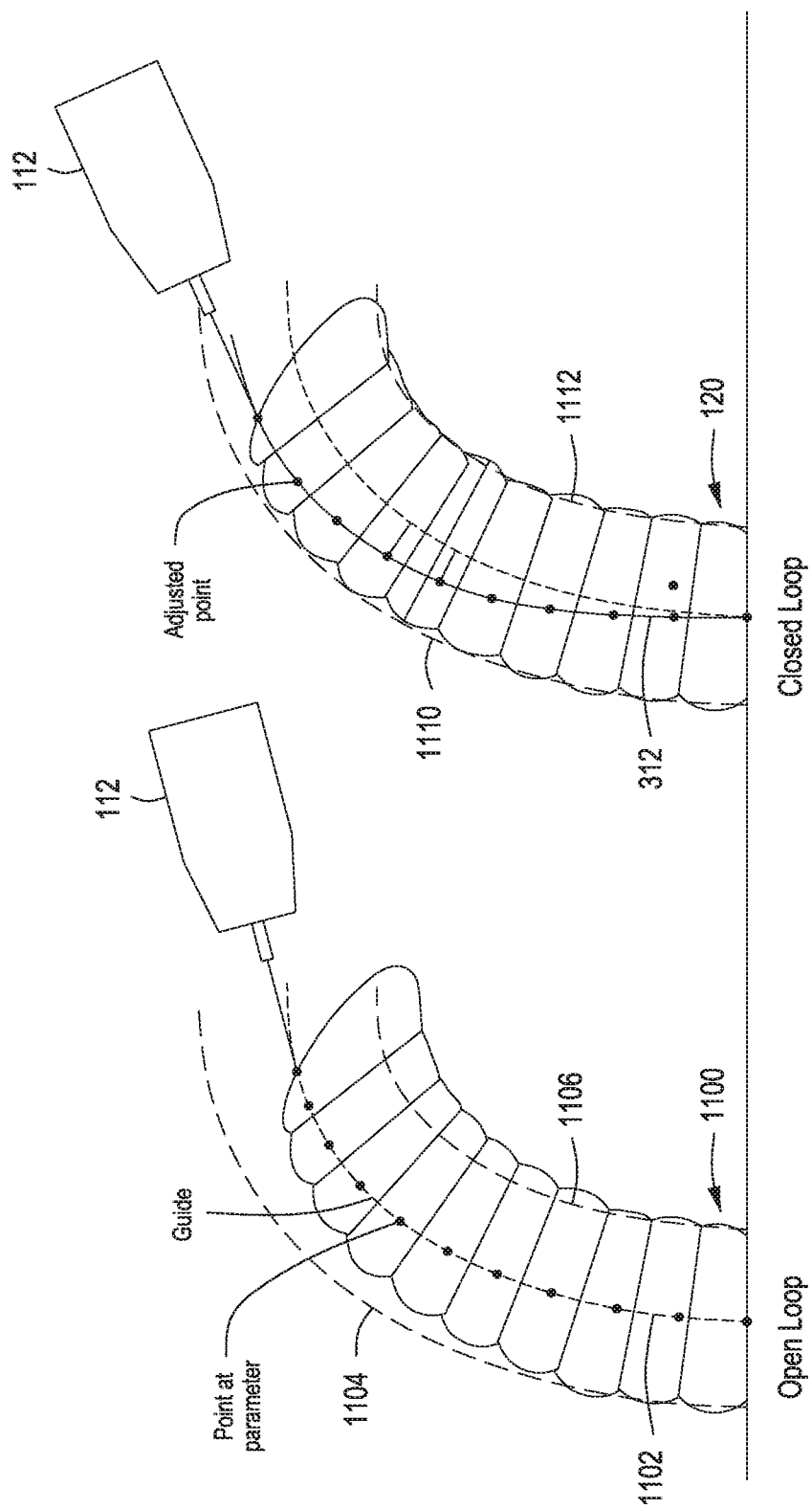
FIG. 11 illustrates how the robot system of FIG. 1 adjusts the deposition of weld beads to compensate for deviations from a guide curve, according to various embodiments of the present invention.

FIG. 11 illustrates how the robot system of FIG. 1 adjusts the deposition of weld beads to compensate for deviations from a guide curve, according to various embodiments of the present invention. As shown, robot system 100 may cause deposition tool 112 to fabricate a 3D object 1100 using an open-loop process. In addition, robot system 100 also causes deposition tool 112 to fabricate 3D object 120 using closed-loop control process 200 described above.

With the open-loop process, robot system 100 causes deposition tool 112 to follow guide curve 1102 during deposition. Robot system 100 generates guide curve 1102 prior to deposition based on geometrical constraints 1104 and 1106 and cannot change guide curve 1102 during deposition. Geometrical constraints 1104 and 1106 may represent a contour of a 3D model that represents the intended shape of 3D object 1100. However, during deposition, 3D object 1100 may diverge from those geometrical constraints for various reasons. For example, gravity may cause 3D object 1100 to sag in the manner shown, therefore causing the contour of 3D object 100 to diverge from geometrical constraints 1104 and 1106. Again, with the open-loop process shown, robot system 100 cannot adjust guide curve 1102 to respond to such divergences.

By contrast, with the closed-loop process shown, robot system 100 is capable of applying guide curve adjustments in order to respect geometrical constraints. During fabrication, robot system 100 causes deposition tool 112 to follow guide curve 312, similar to the open-loop process described above. Robot system 100 may generate guide curve 312 prior to deposition based on geometrical constraints 1110 and 1112, similar to above. However, during deposition, if 3D object 120 diverges from those geometrical constraints, robot system 100 detects those diverges and computes various relevant parameters, including direction of divergence, magnitude of divergence, gravitational effects, and other parameters that are described in greater detail below. Based on these computed parameters, robot system 112 adjusts guide curve 112 to compensate for the corresponding divergences and to keep 3D object 120 aligned with geometrical constraints 1110 and 1112.

Robot system 100 implements a variety of logistical techniques in order to implement the above closed-loop process, including welder monitoring and various coordinate transforms. These approaches are described in greater detail below in conjunction with FIGS. 12A-12C.

Figure 12A:
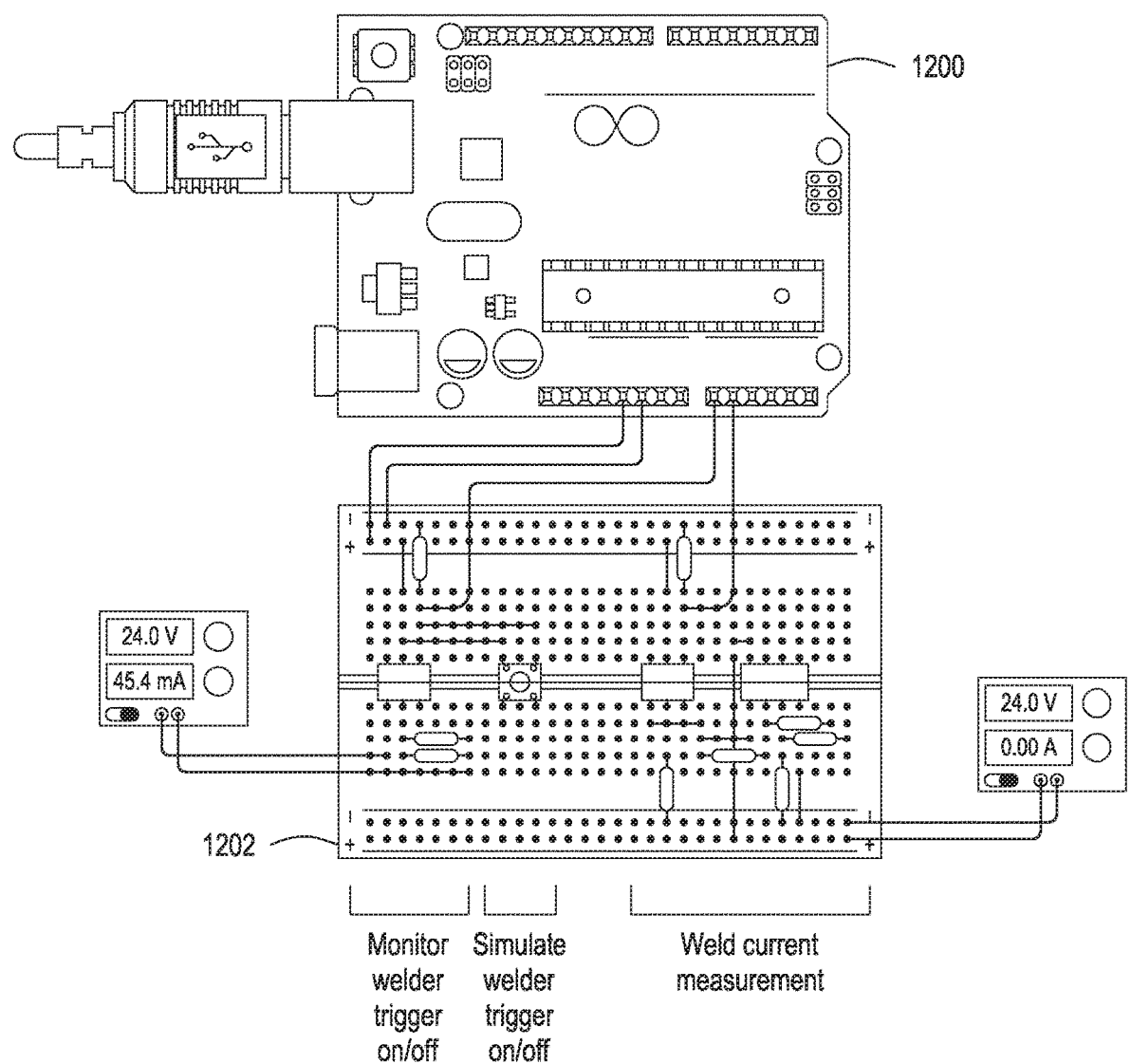
FIGS. 12A-12C illustrate various circuitry and data outputs for monitoring a welding process, according to various embodiments of the present invention.
Figure 12B:
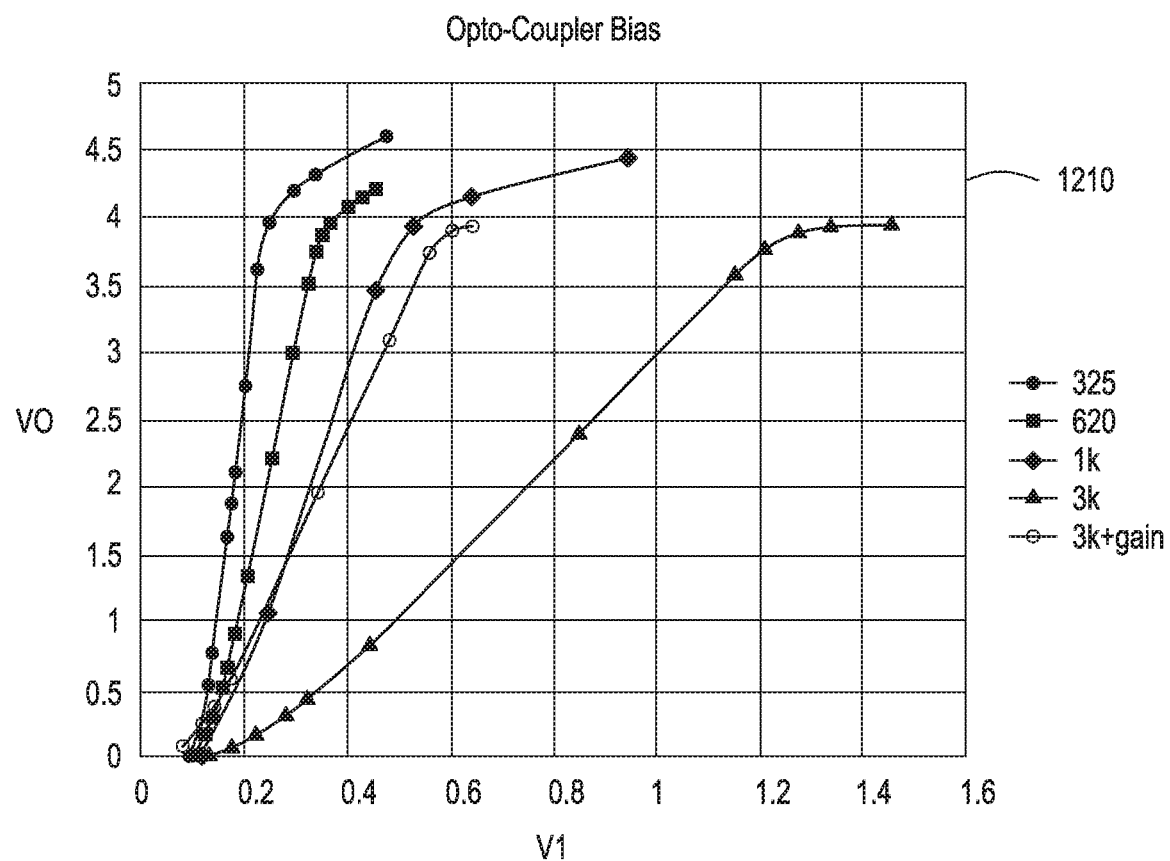
Figure 12C:
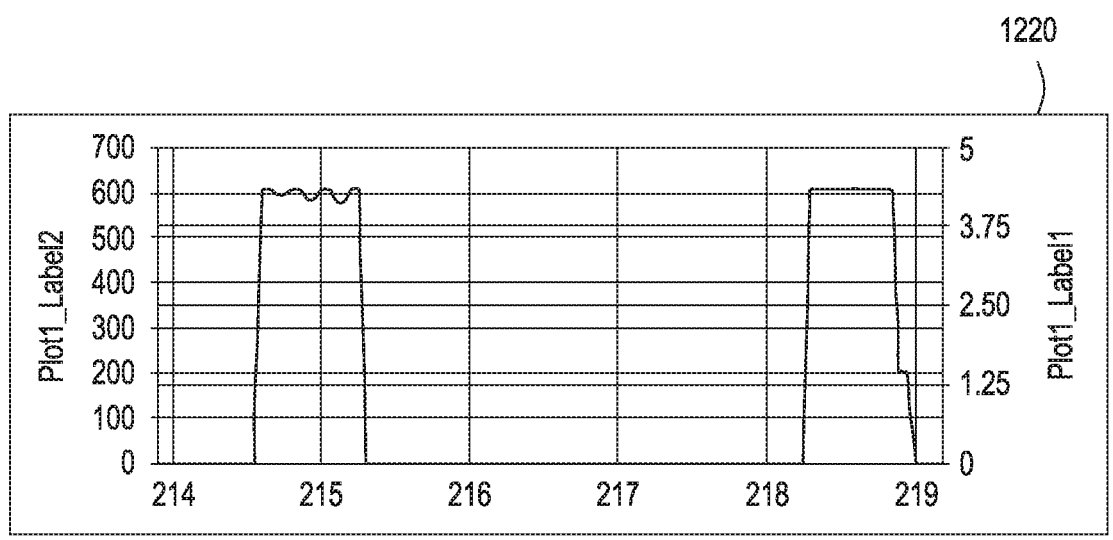

FIGS. 12A-12C illustrate various circuitry and data outputs for monitoring a welding process, according to various embodiments of the present invention. As shown in FIG. 12A, a controller 1200 is coupled to a circuit 1202. Controller 1200 may be an Arduino® device or any other programmable hardware. Circuit 1202 is an application-specific integrated circuit (ASIC) that is configured to measure current consumed by deposition tool 112 during welding. Robot system 100 processes this data to estimate various physical characteristics of a weld bead being deposited in order to adjust target deposition locations and guide curves in the manner described above. As shown in FIG. 12B, robot system 100 processes the current consumed by deposition tool 112, as measured by circuit 1202, to establish the linear response of an opto-coupler to the measured current. Based on this response, robot system 100 determines at any given moment whether deposition tool 112 is depositing material. FIG. 12C illustrates the logged weld current over time.

Figure 13:
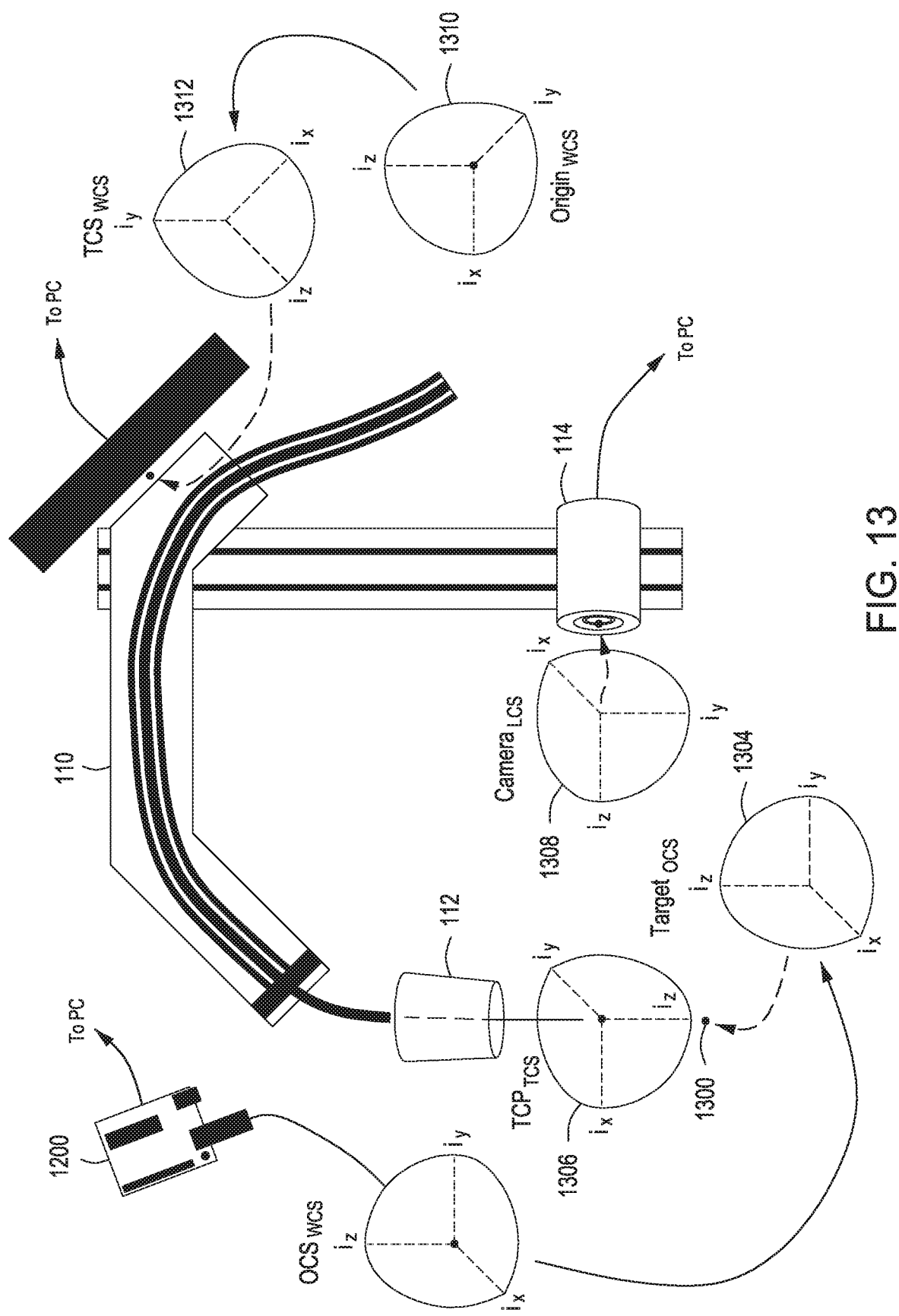
FIG. 13 illustrates a set of coordinate systems associated with different components of the robot system of FIG. 1, according to various embodiments of the present invention.

FIG. 13 illustrates a set of coordinate systems associated with different components of the robot system of FIG. 1, according to various embodiments of the present invention. As shown, robot system 100 implements a variety of coordinate systems in order to deposit and track a weld bead 1300, including coordinate systems 1302, 1304, 1306, 1308, 1310, and 1312. The coordinates of 3D object 120 are defined within coordinate system 1302. The coordinates of a target deposition location for weld bead 1300 are defined within coordinate system 1304. The coordinates of an actual deposition location (as determined via optical device 114) are defined within coordinate system 1306. The coordinates of optical device 114 are defined within coordinate system 1308. Coordinates associated with robot 110 are defined within coordinate system 1310. World space coordinates are defined within coordinate system 1312. Robot system 100 may transform any of the coordinates discussed thus far into any of the other coordinate systems discussed.

Robot system 100 implements the coordinate systems and transforms discussed above in order to process sensor data related to the deposition process. Robot system 100 also relies on these coordinate transforms to position optical device 114, as described in greater detail below in conjunction with FIGS. 14-15.

Figure 14:
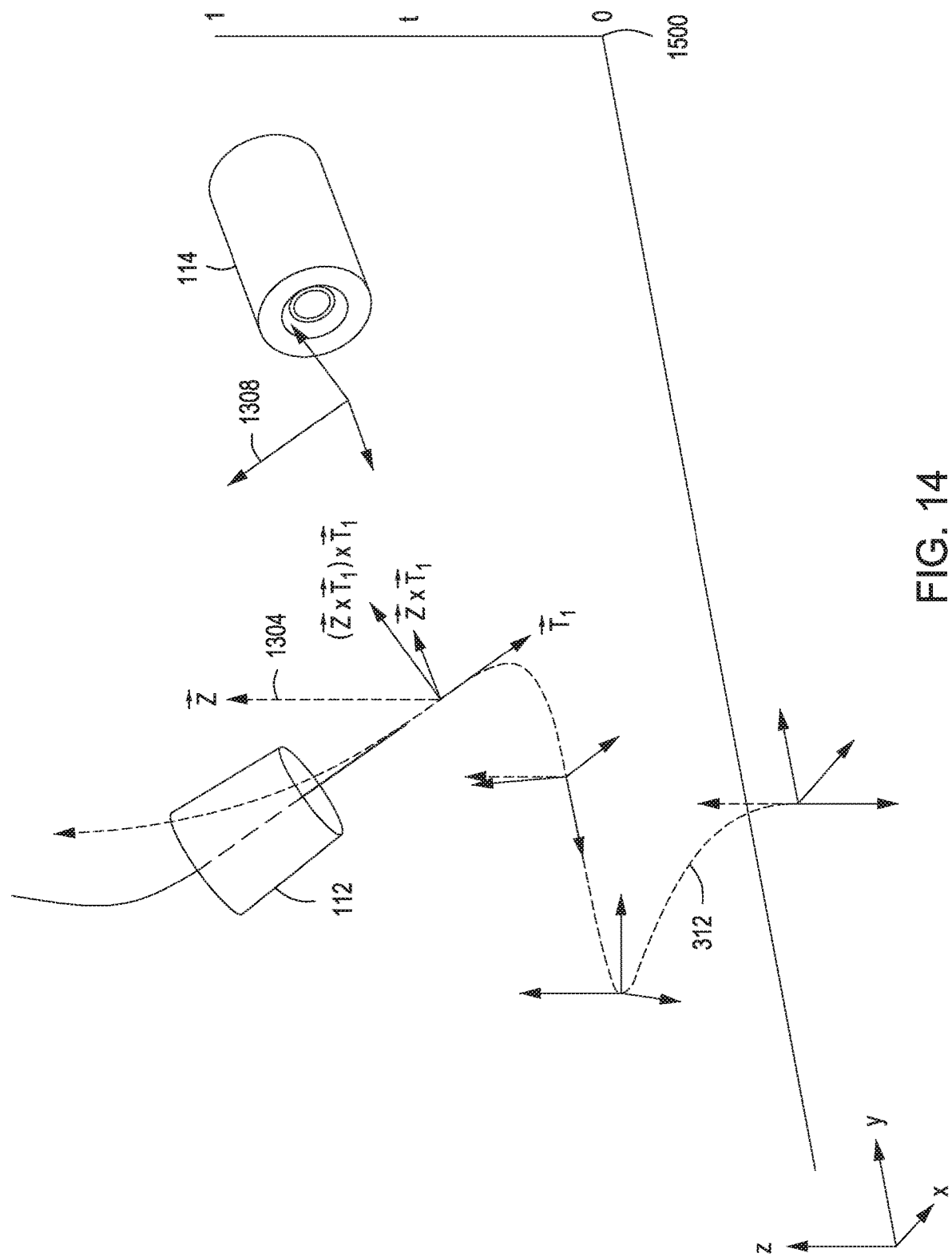
FIG. 14 illustrates relative positioning between an optical device and a 3D object under weld, according to various embodiments of the present invention.

FIG. 14 illustrates relative positioning between an optical device and a 3D object under weld, according to various embodiments of the present invention. As shown, fabrication tool 112 deposits weld beads along guide curve 312 to fabricate 3D object 120. Robot system 100 is configured to transform coordinates between coordinate system 1304 and 1308 in order to maintain specific relative positioning between optical device 114 and a location on 3D object 120 where welding occurs. In particular, robot system 100 positions optical device 112 so that the axis along which optical device 114 captures optical data is perpendicular to the axis along which deposition tool 112 feeds welding material. Robot system 100 may also rotate optical device 114 to maintain a consistent alignment relative to deposition tool 112. This positioning allows frames 206 of video data captured by optical device 114 to show the deposition process in a manner that does not require computer vision processor 220 to re-orient frames 206. Robot system 100 may also position optical device 114 relative to a gravity vector, as described in greater detail below in conjunction with FIG. 15.

Figure 15:
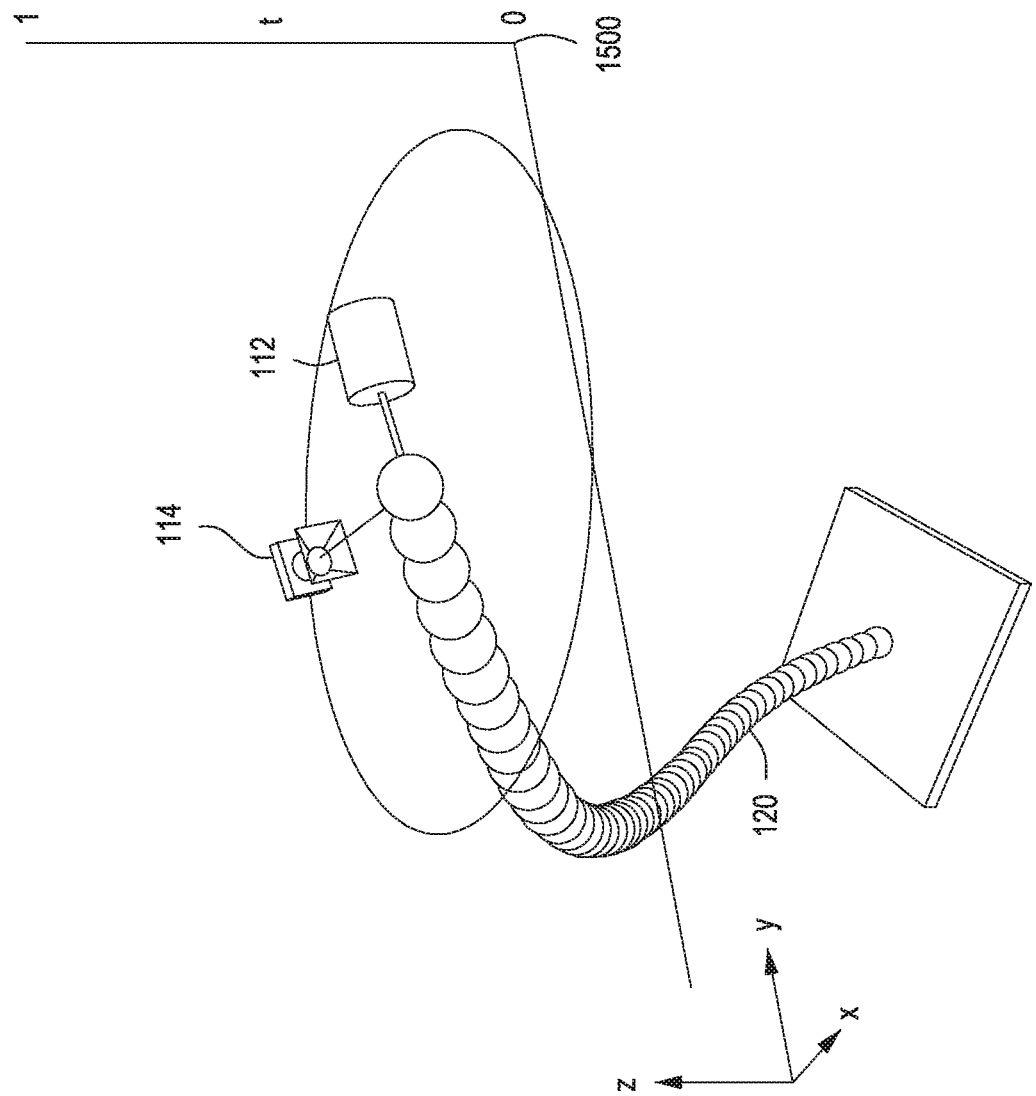
FIG. 15 illustrates how the robot system of FIG. 1 positions an optical device relative to a 3D object under weld to improve data capture, according to various embodiments of the present invention.
Figure 16:
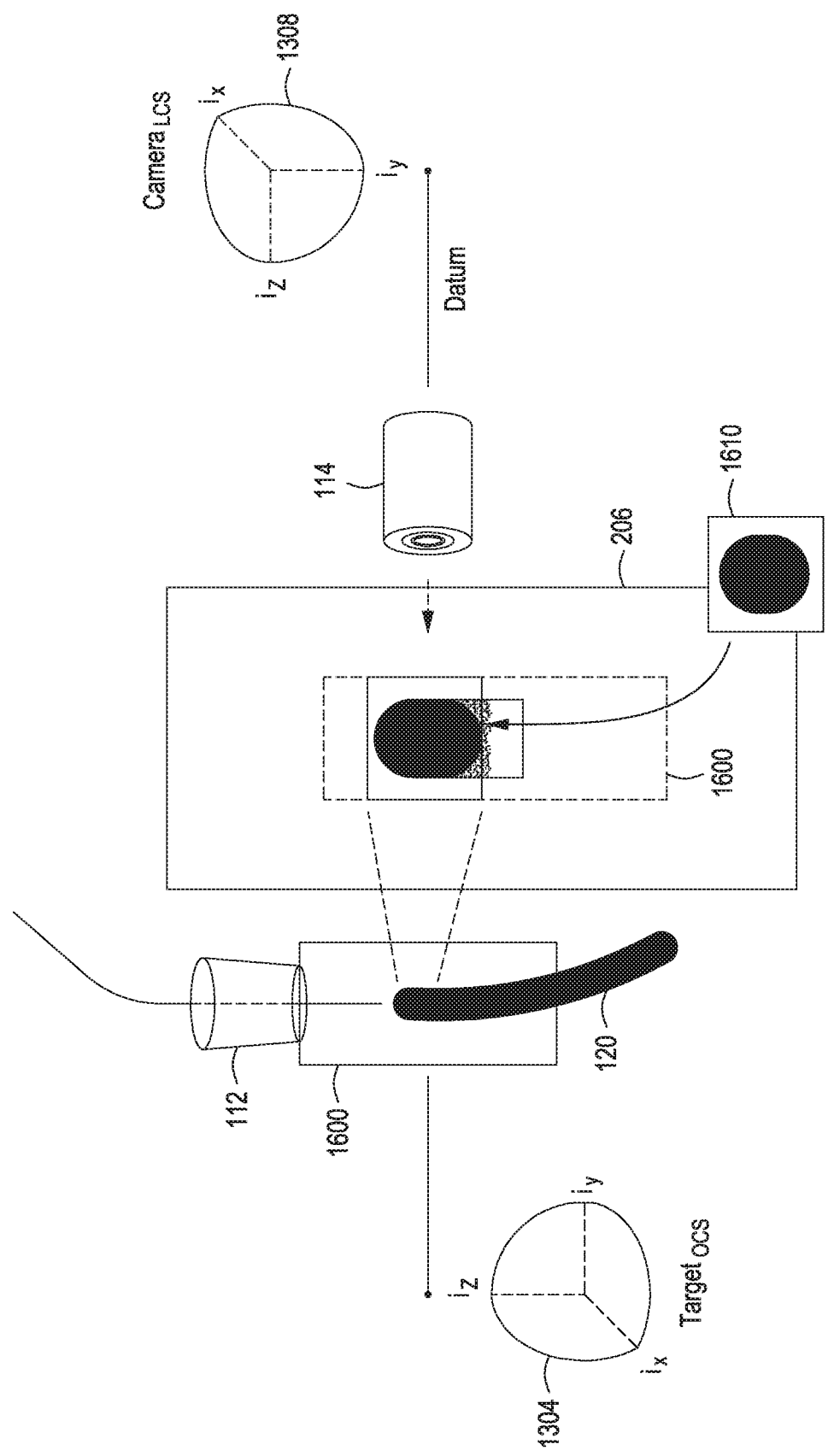
FIG. 16 illustrates how the robot system of FIG. 1 locates a previously deposited weld bead, according to various embodiments of the present invention.
Figure 17:
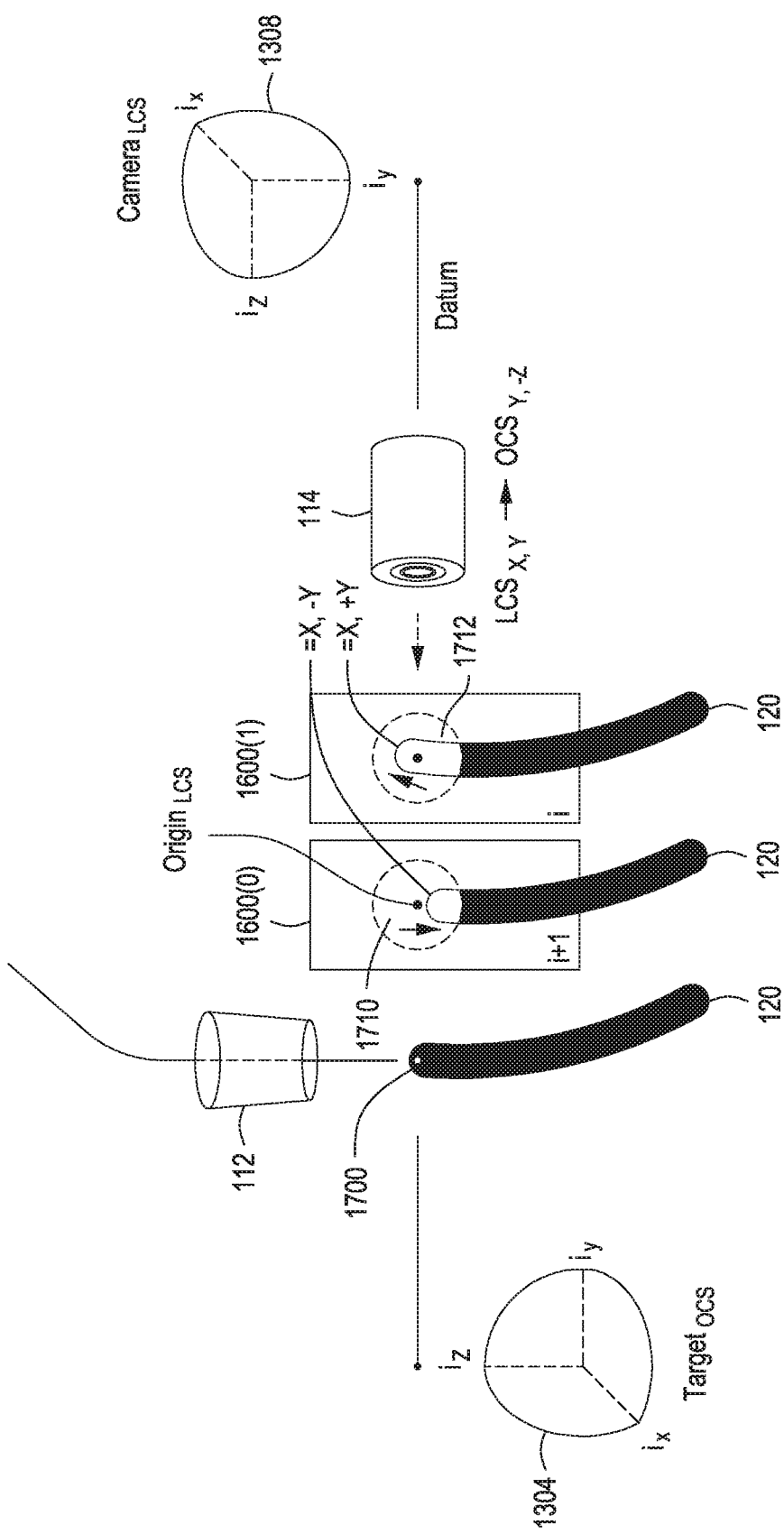
FIG. 17 illustrates how the robot system of FIG. 1 determines a deposition location for a weld bead, according to various embodiments of the present invention.
Figure 18:
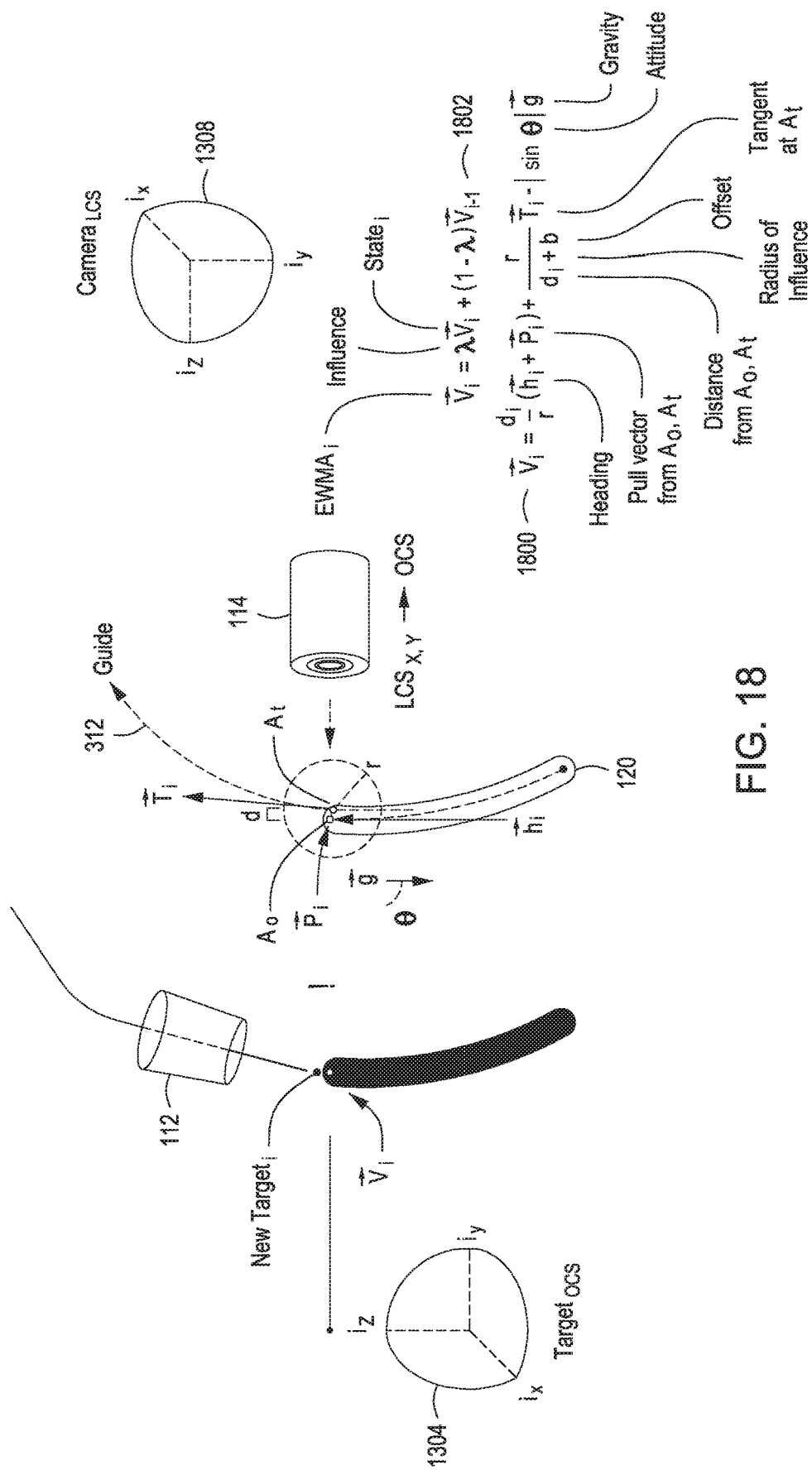
FIG. 18 illustrates how the robot system of FIG. 1 follows a guide curve based on previously deposited weld beads, according to various embodiments of the present invention.

FIG. 15 illustrates how the robot system of FIG. 1 positions an optical device relative to a 3D object under weld to improve data capture, according to various embodiments of the present invention. As shown, robot system 100 may position optical device 114 anywhere along orbit 1500. However, in order to record potential sagging due to gravity, robot system 100 may position optical device 114 perpendicular to a gravity vector. This alignment allows optical device 114 to capture frames 206 of video data that indicate when 3D object diverges from guide curve 312. FIGS. 16-18 discuss how computer vision processor 220 processes frames 206 of video data to track deposited weld beads.

FIG. 16 illustrates how the robot system of FIG. 1 locates a previously deposited weld bead, according to various embodiments of the present invention. As shown, computer vision processor 220 processes a frame 206 of video data to identify a search frame 1600 within which material deposition occurs. Within search frame 1600, computer vision processor searches for groups of pixels that match search template 1610. Search template 1610 may be a conventional computer vision template that indicates a target image to locate within a search frame. In this instance, search template 1610 illustrates a characteristic weld bead during deposition.

FIG. 17 illustrates how the robot system of FIG. 1 determines a deposition location for a weld bead, according to various embodiments of the present invention. As shown, robot system 100 causes deposition tool 112 to deposit a weld bead 1700 onto 3D object 120. Subsequently, robot system 100 determines a target location 1710 for a subsequent weld bead. Robot system 100 may determine target location 1710 within a search frame 1600(0). Robot system 100 then deposits a weld bead 1712 at or near target location 1710. In practice, weld bead 1712 is typically offset from target location 1710 by an incremental amount in the X, Y, and/or Z directions due to fabrication variations. Robot system 100 processes search frames 1600(0) and 1600(1) to determine this incremental amount, and then adjusts the guide curve followed by robot system 100 accordingly to compensate for these offsets, as described in greater detail below in conjunction with FIG. 18.

FIG. 18 illustrates how the robot system of FIG. 1 follows a guide curve based on previously deposited weld beads, according to various embodiments of the present invention. As shown, robot system 100 causes deposition tool 112 to follow guide curve 312 during deposition of weld beads, and optical device 114 captures frames 206 of video data, as discussed previously. Once deposition tool 112 has deposited weld bead 1712 proximate to target location 1710, code generator 210 within robot system 100 determines the distance between target location 1710 and a computed centroid location of the deposited weld bead. Code generator 210 then evaluates equations 1800 and 1802 in conjunction with one another in order to update control code 204, thereby modifying fabrication of 3D object 120 based on feedback generated during deposition.

Equation 1800 includes three terms that generally govern (i) the rate at which deposited weld beads converge or diverge with corresponding target locations, (ii) the degree with which that convergence or divergence compares to a given region, and (iii) the effects of gravity relative to deposition angle. Equation 1800 evaluates to a tangent vector along guide curve 312. Guide curve 312 may be dynamically defined by such vectors over many evaluations of equation 1800. Thus, by evaluating equation 1800 continuously, robot system 100 modifies the direction along which deposition tool 312 deposits weld beads. In addition, equation 1802 may be evaluated to scale the vector generated via equation 1800 based on previously computed vectors and based on an influence parameter. With this approach, robot system 100 may smooth guide curve 312 so that large divergences between weld beads and target locations do not cause correspondingly large changes to guide curve 312. In one embodiment, robot system 100 maintains separate a print curve that is separate from guide curve, and applies modifications based on equations 1800 and 1802 to print curve in order to better align print curve with guide curve.

During the deposition process, robot system 100 outputs a collection of real-time data discussed, by way of example, below in conjunction with FIG. 19.

Figure 19:
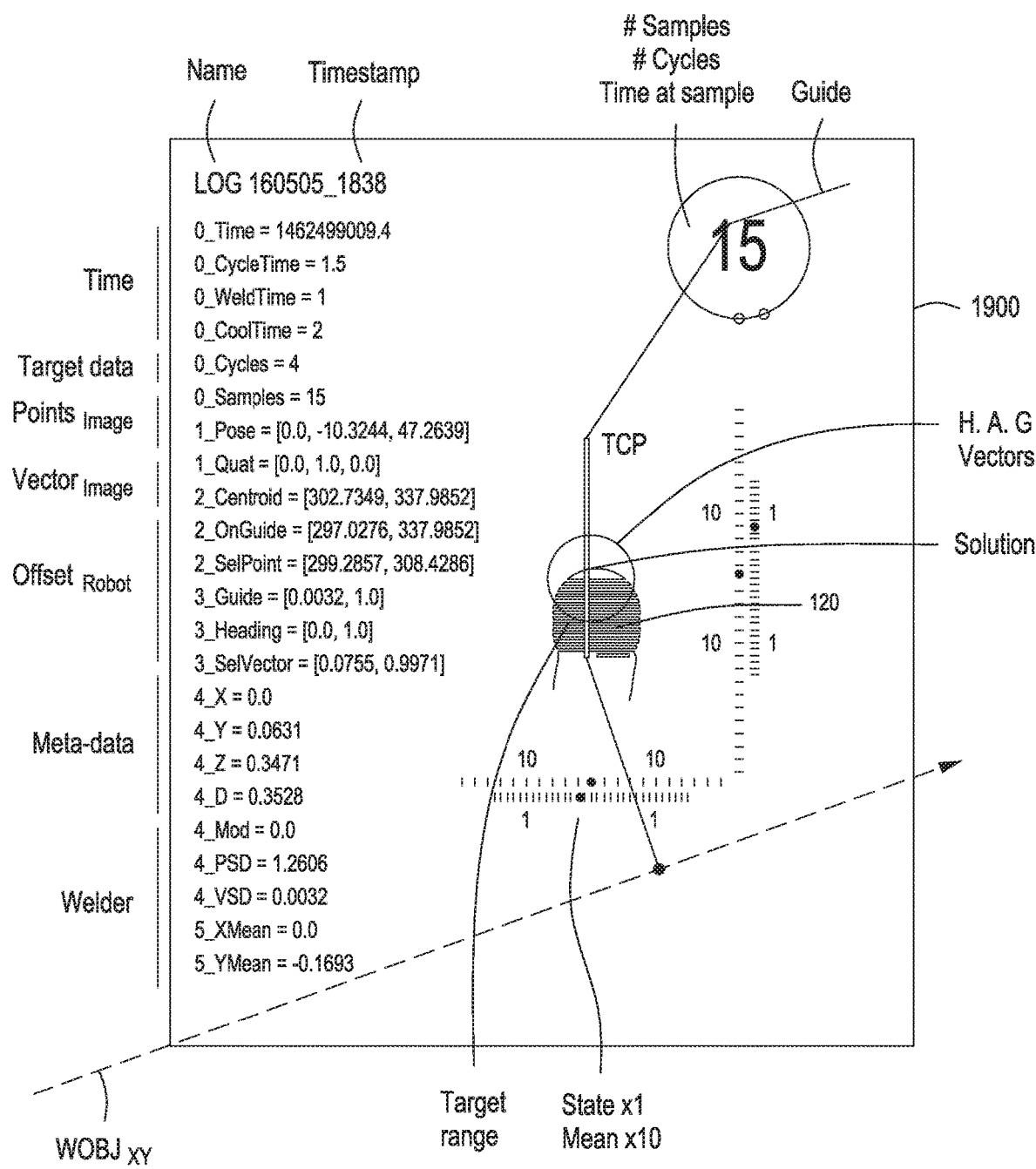
FIG. 19 is a screen capture that illustrates the real-time output of the robot system of FIG. 1 during welding, according to various embodiments of the present invention.

FIG. 19 is a screen capture that illustrates the real-time output of the robot system of FIG. 1 during welding, according to various embodiments of the present invention. As shown, screen capture 1900 shows the deposition of weld beads onto 3D object 120 and also outputs other data and metadata related to material deposition. In one embodiment, robot system 100 processes any and all of the data shown in screen capture 1900 to establish one or more trends that represent the welding process over time. Robot system 100 may then combine this trend data with newly acquired real-time data to compensate for unexpected process variations.

Referring generally to FIGS. 10-19, the techniques described in these figures are also described in stepwise fashion below in conjunction with FIGS. 20-21.

Figure 20:
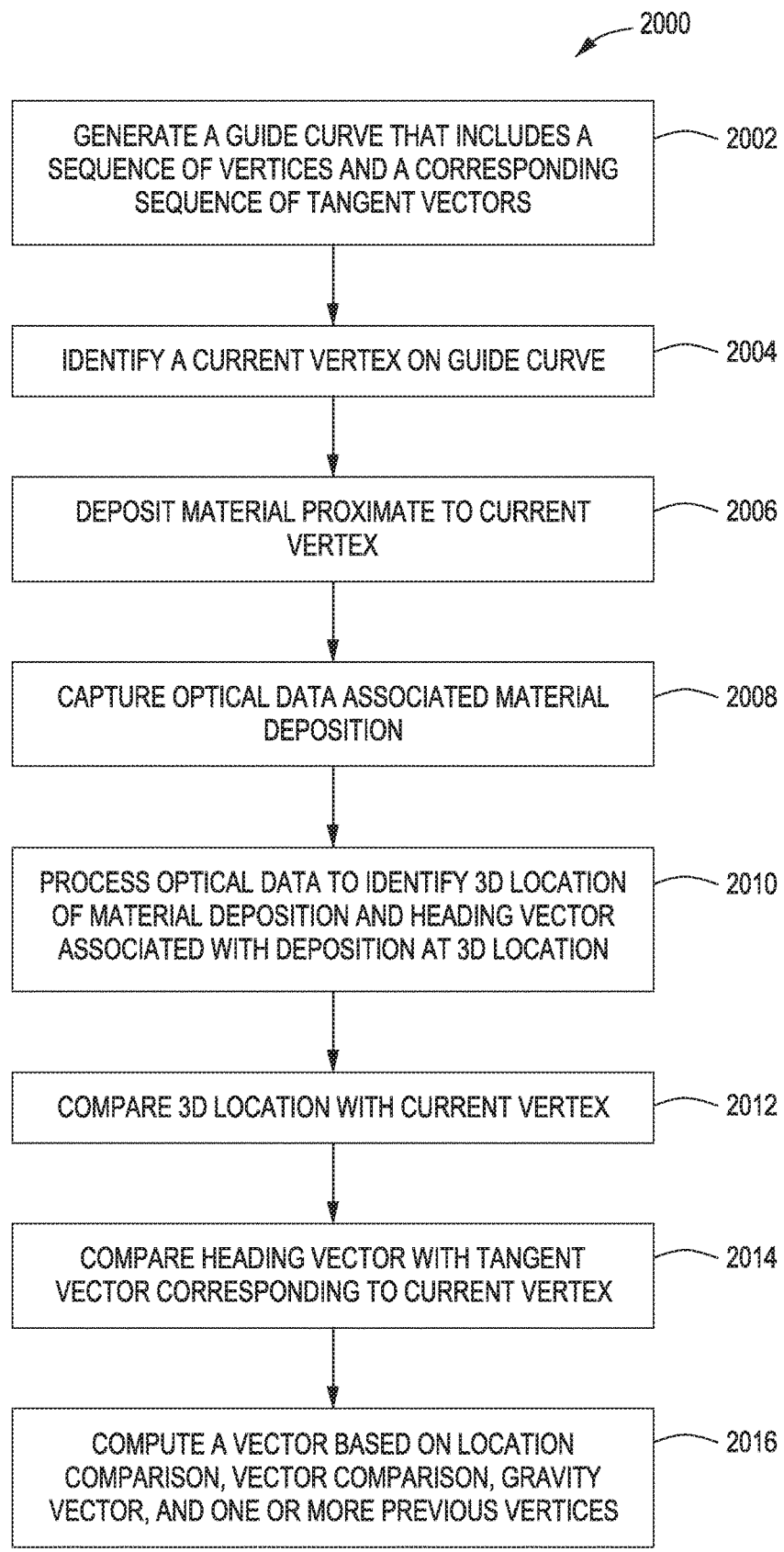
FIG. 20 is a flow diagram of method steps for fabricating a 3D object based on real-time optical data, according to various embodiments of the present invention.

FIG. 20 is a flow diagram of method steps for fabricating a 3D object based on real-time optical data, according to various embodiments of the present invention. Although the method steps are described in conjunction with the systems of FIGS. 1-7 and 10-19, persons skilled in the art will understand that any system configured to perform the method steps, in any order, is within the scope of the present invention.

As shown, a method 2000 begins at step 2002, where robot system 100 generates a guide curve that includes a sequence of vertices and a corresponding sequence of tangent vectors. Guide curve 312 shown in FIG. 3 is one example of a guide curve. Robot system 100 may generate the guide curve based on fabrication data 202. At step 2004, robot system 100 identifies a current vertex on the guide curve. At step 2006, robot system 100 causes deposition tool 112 to deposit a portion of material proximate to the current vertex.

At step 2008, optical device 114 captures frames 206 of video data associated with the deposition performed at step 2006. At step 2010, computer vision processor 220 processed frames 206 to identify 3D coordinates where the portion of material was deposited at step 2006. In doing so, computer vision processor 220 implements the techniques described above in conjunction with FIGS. 16-18. Computer vision processor 220 also determines a heading vector associated with those 3D coordinates. At step 2012, code generator 210 within robot system 100 compares the 3D location with the current vertex to determine a distance between that location and the vertex. At step 2014, code generator 210 compares the heading vector with a tangent vector corresponding to the current vertex. At step 2016, code generator 210 computes a vector based on the location comparison performed at step 2012, the vector comparison performed at step 2014, a gravity vector, and one or more previous vertices. In doing so, robot system 100 may evaluate equations 1800 and 1802.

Step 2010 of the method 2000 may be implemented via a method described in greater detail below in conjunction with FIG. 21.

Figure 21:
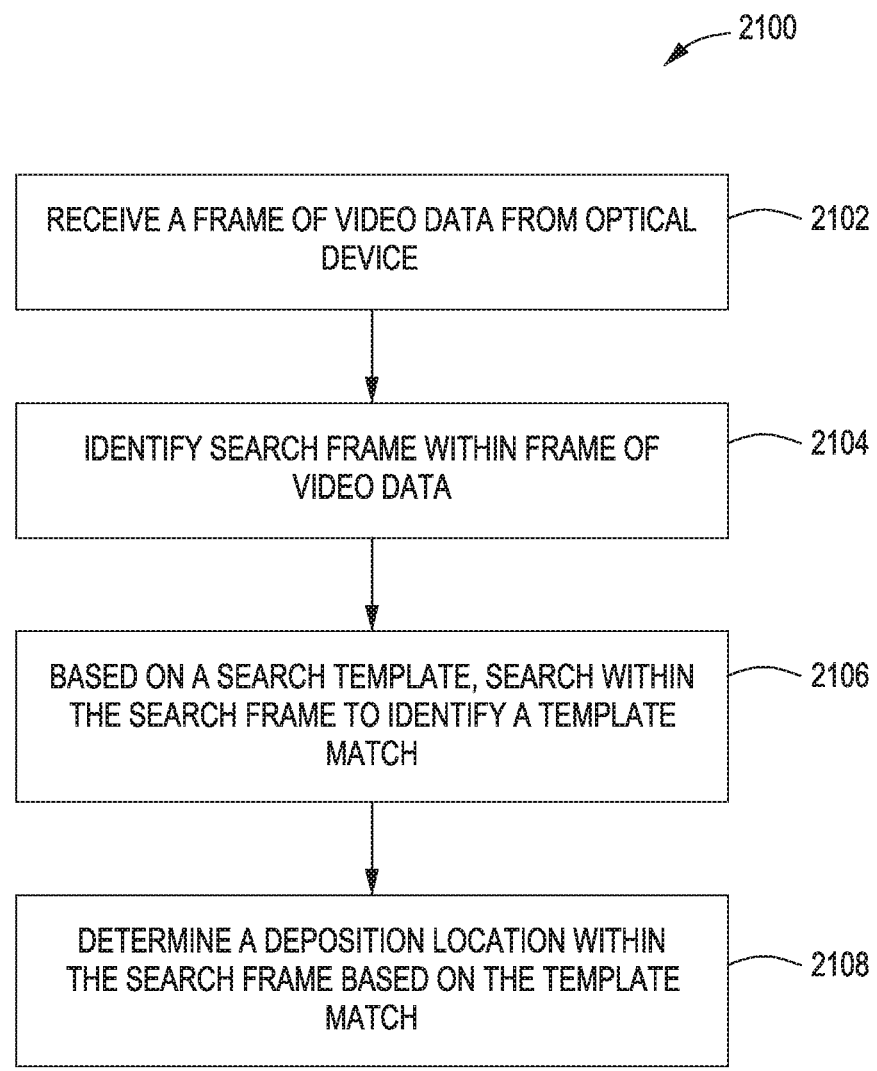
FIG. 21 is a flow diagram of method steps for determining a weld location based on real-time optical data, according to various embodiments of the present invention.

FIG. 21 is a flow diagram of method steps for determining a weld location based on real-time optical data, according to various embodiments of the present invention. Although the method steps are described in conjunction with the systems of FIGS. 1-7 and 10-20, persons skilled in the art will understand that any system configured to perform the method steps, in any order, is within the scope of the present invention.

As shown, a method 2100 begins at step 2102, where computer vision processor 220 receives a frame 206 of video data from optical device 114. At step 2102, computer vision processor 220 identifies a search frame within the frame of video data. At step 2104, computer vision processor 220 searches within the search frame identified at step 2102 for a search template, and identifies a set of pixels within the search frame that match the search template. At step 2108, computer vision processor determines a deposition location within the search frame based on the template match. In doing so, computer vision processor 220 may determine a centroid location for a weld bead depicted in the search frame. Persons skilled in the art will understand that the method 2100 represents only one approach to determining a weld location, and that other approaches may also be possible.

Referring generally to FIGS. 1-21, the techniques described herein allow robot system 100 to perform highly complicated fabrication operations to generate complex 3D objects. Because such operations cannot be performed with conventional 3D printers, such 3D objects cannot be created with conventional 3D printing techniques either. FIGS. 22A-27 describe various unconventional printing techniques made possible by robot system 100.

Unconventional Deposition Techniques

Figure 22A:
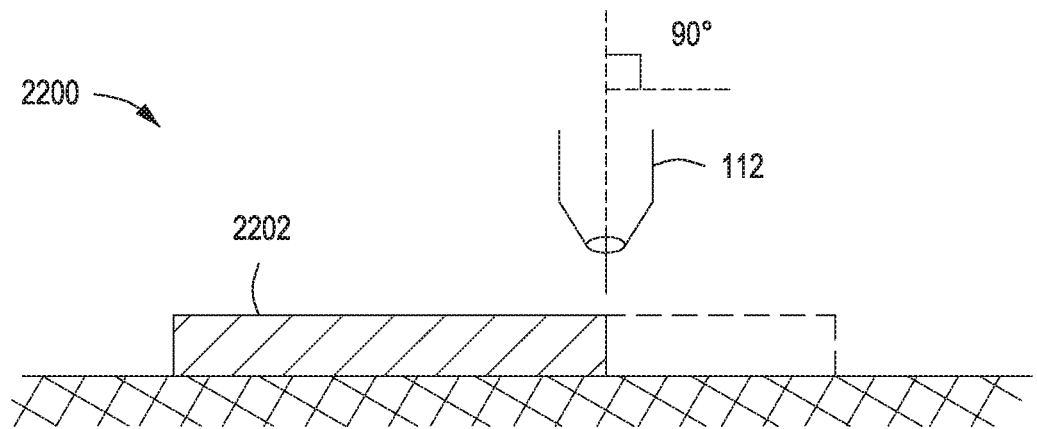
FIGS. 22A-22B illustrate the robot system of FIG. 1 depositing material along non-horizontal layers of a 3D object, according to various embodiments of the present invention.
Figure 22B:
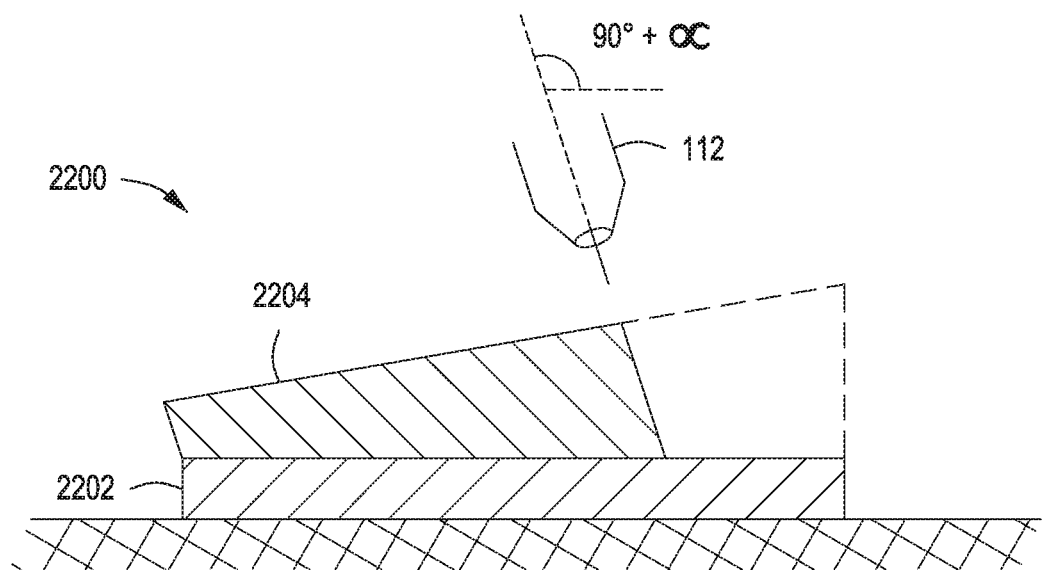

FIGS. 22A-22B illustrate the robot system of FIG. 1 depositing material along non-horizontal layers of a 3D object, according to various embodiments of the present invention. As shown in FIG. 22A, robot system 100 causes deposition tool 112 to deposit a layer 2202 of material when fabricating a 3D object 2200. A conventional 3D printer would only be able to deposit another horizontal layer having equal thickness and continuous cross-section compared to layer 2202.

However, as shown in FIG. 22B, robot system 100 is capable of depositing a layer 2204 that is not horizontal to layer 2202 and has a cross-section with varying thickness. Robot system 100 may perform such deposition by varying the flow rate of material used for deposition and/or following guide curves that define layer 2204, while also varying the angle of deposition tool 112 relative to horizontal.

Figure 23A:
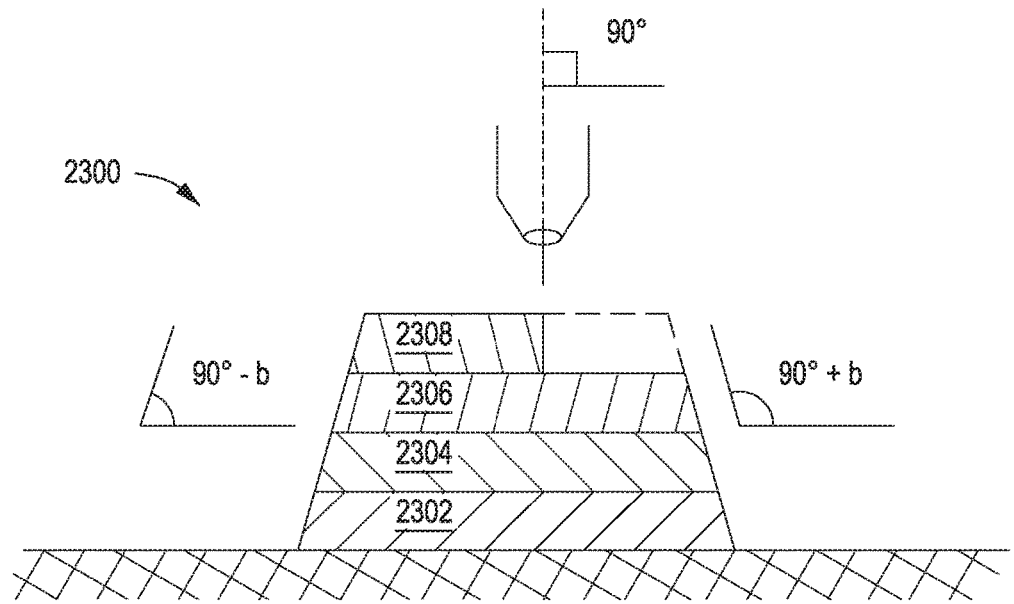
FIGS. 23A-23B illustrate the robot system of FIG. 1 depositing material along non-parallel layers of a 3D object, according to various embodiments of the present invention.
Figure 23B:
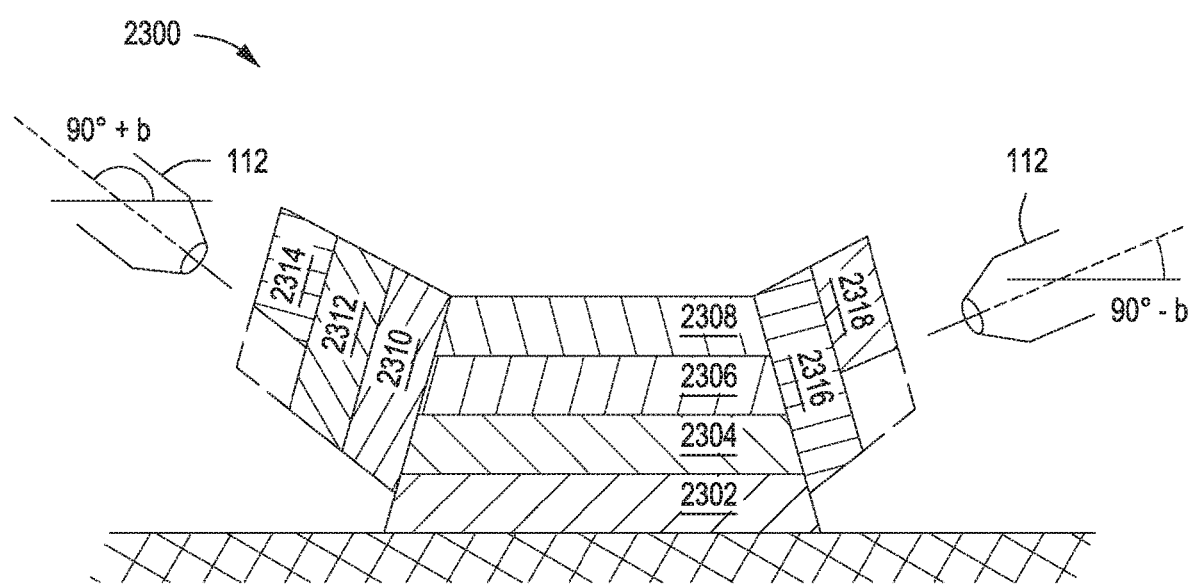

FIGS. 23A-23B illustrate the robot system of FIG. 1 depositing material along non-parallel layers of a 3D object, according to various embodiments of the present invention. As shown in FIG. 23A, robot system 100 causes deposition tool 112 to deposit layers 2302, 2304, 2306, and 2308 when fabricating a 3D object 2300. A conventional 3D printer can only deposit additional layers on top of layer 2308.

However, as shown in FIG. 23B, robot system 100 is capable of depositing additional layers 2310, 2312, 2314, 2316, and 2318 at off-horizontal angles. Robot system 100 may perform such deposition based on a branching deposition plan, such as deposition plan 510 shown in FIG. 5.

Figure 24A:
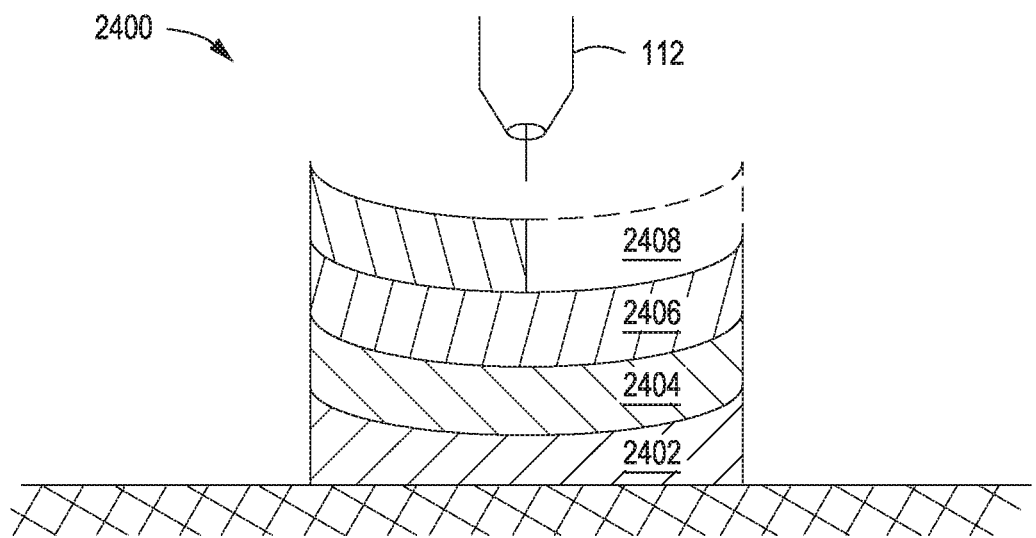
FIGS. 24A-24B illustrate the robot system of FIG. 1 depositing material along non-planar layers of a 3D object, according to various embodiments of the present invention.
Figure 24B:
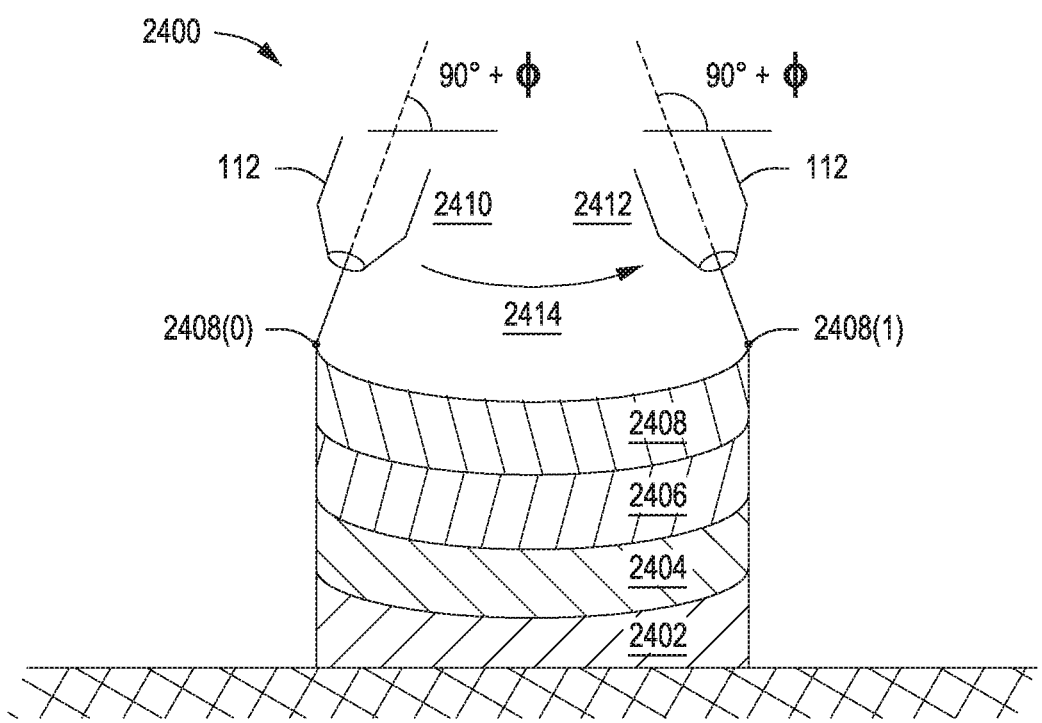

FIGS. 24A-24B illustrate the robot system of FIG. 1 depositing material along non-planar layers of a 3D object, according to various embodiments of the present invention. As shown in FIG. 24A, robot system 100 causes deposition tool 112 to deposit layers 2402, 2404, 2406, and 2408 to fabricate 3D object 2400. Unlike conventional 3D printers, robot system 100 is capable of depositing layers that are non-planar, as is shown.

As shown in FIG. 24B, robot system 100 fabricates non-planar layers by sweeping deposition tool 112 from position 2410 to position 2414 across an arc 2414. To implement this technique, robot system 100 may follow a guide curve that traverses from vertex 2408(0) to vertex 2408(1) along arc 2414.

Figure 25:
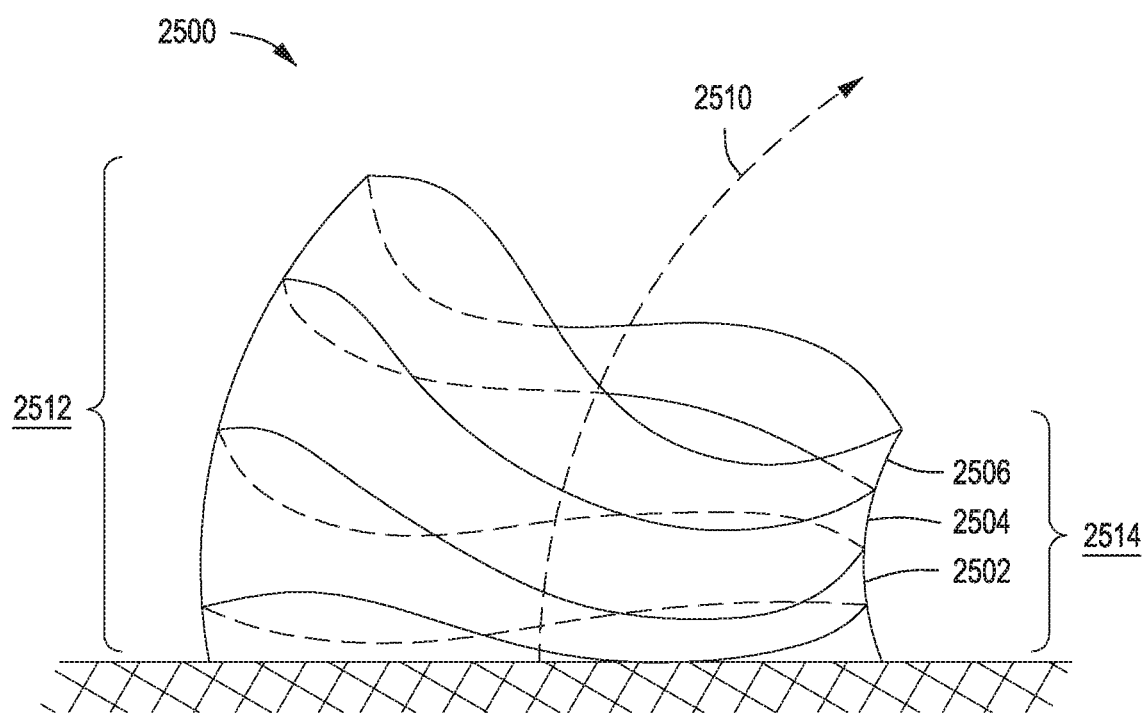
FIG. 25 illustrates the robot system of FIG. 1 depositing material along non-horizontal, non-parallel, and non-planar layers of a 3D object, according to various embodiments of the present invention.

FIG. 25 illustrates the robot system of FIG. 1 depositing material along non-horizontal, non-parallel, and non-planar layers of a 3D object, according to various embodiments of the present invention. As shown, robot system 100 causes deposition tool 312 to fabricate a 3D object 2500 that includes multiple non-planar, non-horizontal, and non-parallel layers 2502, 2504, and 2506. 3D object 2500 has a central axis 2510. Because this central axis is curved, layers 2502, 2504, and 2506 vary in thickness between side 2512 and 2514 of 3D object 2500. As fabrication progresses and 3D object 2500 grows, that object will begin to overhang towards side 2514. Unlike conventional 3D printers, though, robot system 100 does not need to provide support for this overhang. In one embodiment, robot system 100 fabricates 3D object 2500 by generating one continuous spiraling layer aligned with central axis 2510.

Figure 26A:
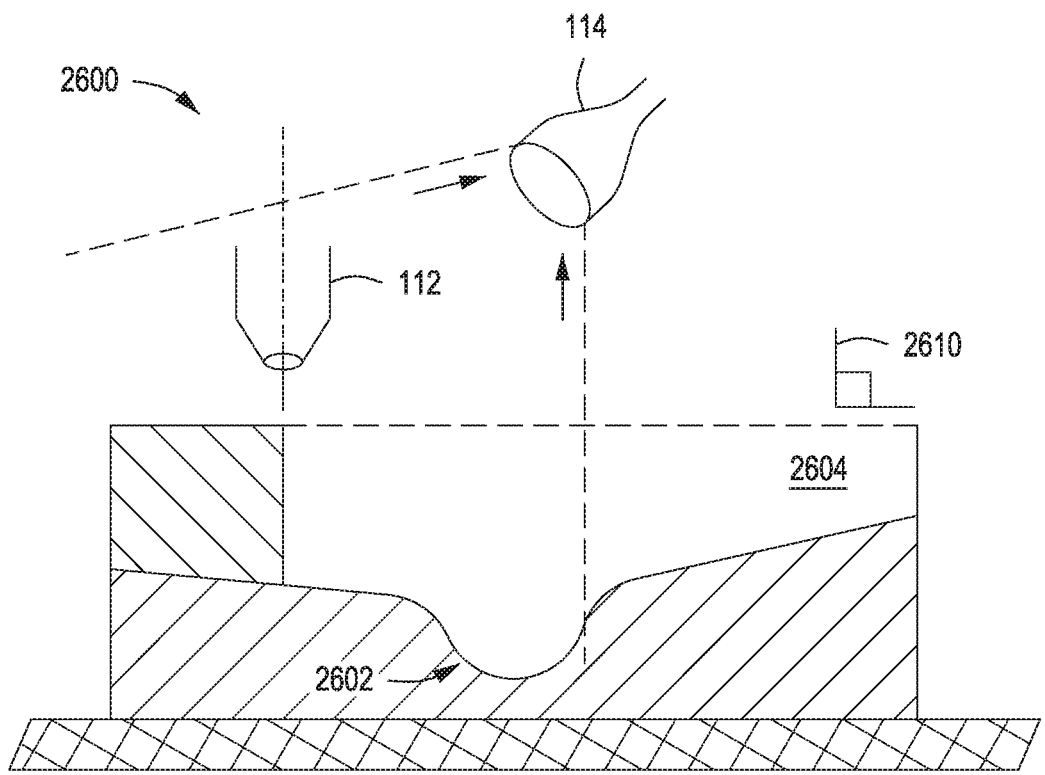
FIGS. 26A-26B illustrate the robot system of FIG. 1 adjusting a fabrication plan in real-time based on local deviations in a 3D object, according to various embodiments of the present invention.
Figure 26B:
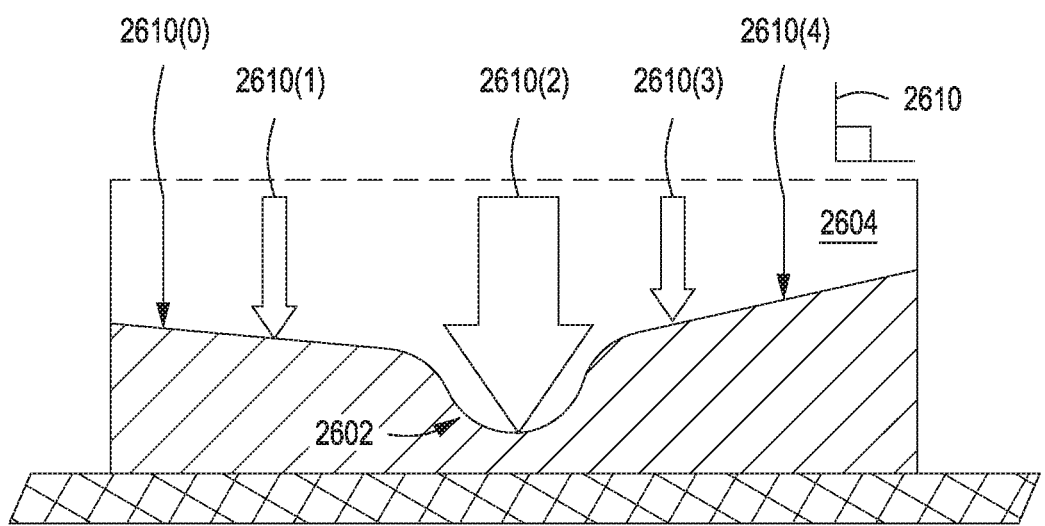

FIGS. 26A-26B illustrate the robot system of FIG. 1 adjusting a fabrication plan in real-time based on local deviations in a 3D object, according to various embodiments of the present invention. As shown, robot system 100 causes deposition tool 112 to deposit layers of material to fabricate a 3D object 2600. Optical device 114 detects a dimple 2602 in a previous layer of 3D object 2600. However, 3D object 2600 is subject to the constraint that top surface 2604 of 3D object 2600 must have an angle 2610 relative to horizontal. In order to adhere to this constraint, robot system 100 dynamically accounts for dimple 2602 in the manner shown in FIG. 26B.

As shown in FIG. 26B, robot system 100 adjusts deposition rate 2610 to increase proximate to dimple 2602 and decrease in other places. For example, deposition rate 2610(2) is greater than deposition rates 2610(1) and 2610(3) and much greater than deposition rates 2610(0) and 2610(4), as indicated by arrow thickness. Thus, progressing from left to right, deposition rate 2610 increases when approaching dimple 2602 and then decreases afterward. Robot system 100 determines deposition rates 2610 based on frames of video data gathered by optical device 114 and processed by computer vision processor 220.

Figure 27:
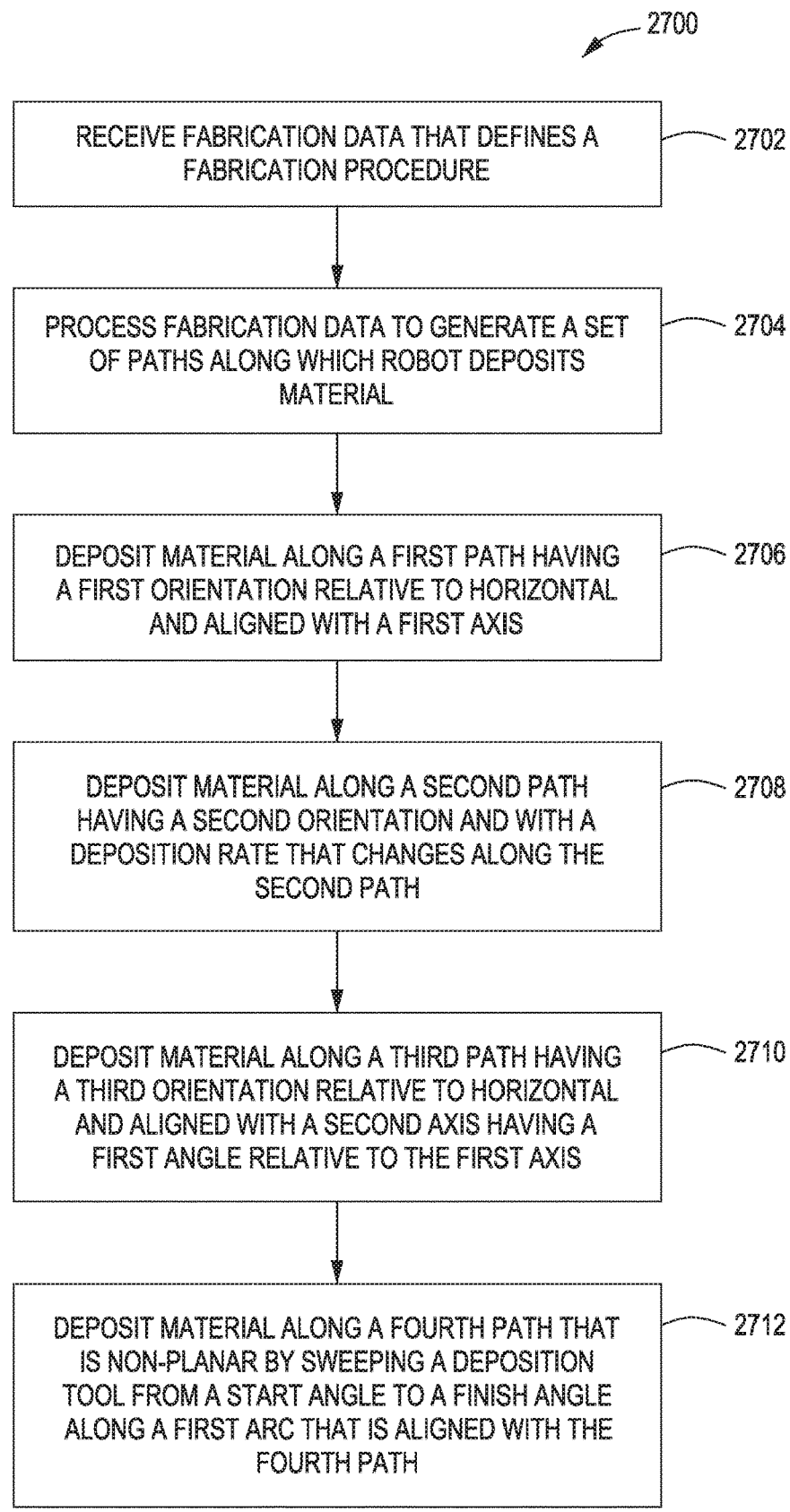
FIG. 27 is a flow diagram of method steps for fabricating a 3D object using different deposition techniques, according to various embodiments of the present invention.

FIG. 27 is a flow diagram of method steps for fabricating a 3D object using different deposition techniques, according to various embodiments of the present invention. Although the method steps are described in conjunction with the systems of FIGS. 1-7, 10-20, and 22A-26B, persons skilled in the art will understand that any system configured to perform the method steps, in any order, is within the scope of the present invention.

As shown, a method 2700 begins at step 2702, where code generator 210 within closed-loop control cycle 200 of robot system 100 receives fabrication data 202 that defines a fabrication procedure. At step 2704, code generator 210 processes fabrication data 202 to generate a set of guide curves along which robot system 100 deposits material. At step 2706, robot system 100 causes deposition tool 112 to deposit material along a first path having a first orientation relative to horizontal and aligned with a first axis. At step 2708, robot system 100 causes deposition tool 112 to deposit material along a second path having a second orientation and with a deposition rate that changes along the second path. In this manner, robot system may fabricate 3D object 2200 shown in FIG. 22.

At step 2710, robot system 100 causes deposition tool 112 to deposit material along a third path having a third orientation relative to horizontal and aligned with a second axis having a first angle relative to the first axis. In this manner, robot system 100 may fabricate 3D object 2300 shown in FIG. 23. At step 2712, robot system 100 causes deposition tool 112 to deposit material along a fourth path that is non-planar by sweeping deposition tool 112 from a start angle to a finish angle along a first arc that is aligned with the fourth path. Robot system 100 implements step 2710 to generate 3D object 2400 of FIG. 24.

By performing individual steps of the method 2700, robot system 100 can fabricate any of the shapes shown in FIGS. 22A-24B. In addition, by performing all steps in conjunction with one another, robot system 100 may fabricate complex objects such as 3D object 2500 shown in FIG. 25.

Figure 28:
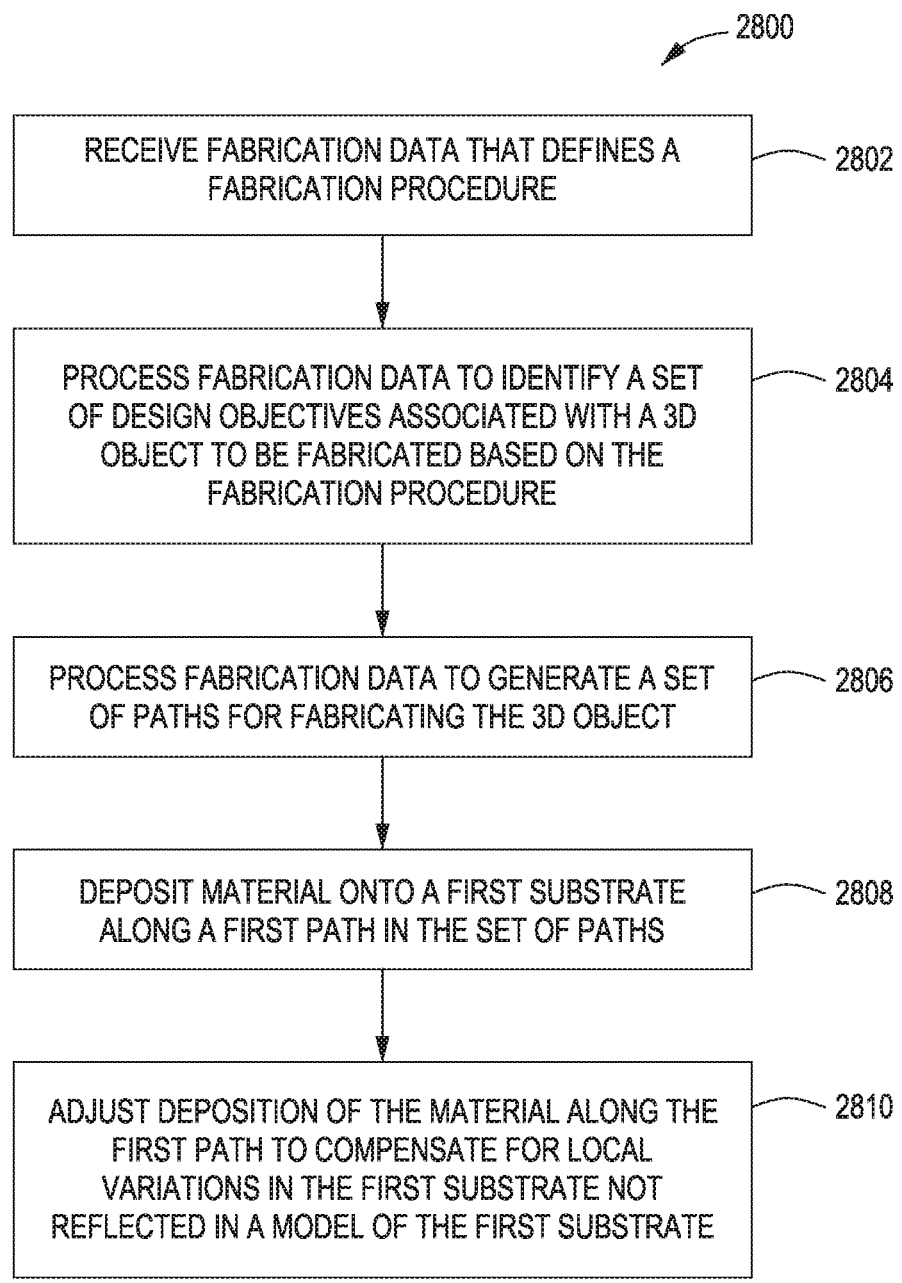
FIG. 28 is a flow diagram of method steps for fabricating a 3D object to meet a set of design objectives, according to various embodiments of the present invention.

FIG. 28 is a flow diagram of method steps for fabricating a 3D object to meet a set of design objectives, according to various embodiments of the present invention. Although the method steps are described in conjunction with the systems of FIGS. 1-7, 10-20, and 22A-26B, persons skilled in the art will understand that any system configured to perform the method steps, in any order, is within the scope of the present invention.

As shown, a method 2800 begins at step 2802, where code generator 210 within closed-loop control cycle 200 of robot system 100 receives fabrication data 202 that defines a fabrication procedure, similar to step 2702 of the method 2700.

At step 2804, code generator 210 within closed-loop control process 200 of robot system 100 processes fabrication data 202 to identify a set of design objectives associated with a 3D object to be fabricated based on the fabrication procedure. The design objectives indicate that certain portions of the 3D object have a specific shape, as described by way of example in conjunction with FIG. 26.

At step 2804, code generator 210 processes fabrication data 202 to generate a set of paths for fabricating the 3D object. At step 2806, robot system 100 causes deposition tool 112 to deposit material onto a first substrate of the 3D object along a first path in the set of paths. At step 2808, robot system 100 detects variations in the first substrate and, in response to those variations, adjusts deposition of the material along the first path to compensate. In one embodiment, robot system 100 implements a laser scanner to detect variations in the first substrate. Dimple 2602 shown in FIGS. 26A-26B is one example of a variation. According to this technique, robot system 100 may meet the design objectives set forth in fabrication data 202 despite local variations in the 3D object.

In sum, a robot system is configured to fabricate three-dimensional (3D) objects using closed-loop, computer vision-based and/or reality capture-based control. The robot system initiates fabrication based on a set of fabrication paths along which material is to be deposited. During deposition of material, the robot system captures video data or 3D point cloud data and processes that data to determine the specific locations where the material is deposited. Based on these locations, the robot system adjusts future deposition locations to compensate for deviations from the fabrication paths. Additionally, because the robot system includes a 6-axis robotic arm, the robot system can deposit material at any location, along any pathway, or across any surface. Accordingly, the robot system is capable of fabricating a 3D object with multiple non-parallel, non-horizontal, and/or non-planar layers.

At least one advantage of the techniques described above is that the robot system is capable of tolerating and compensating for a wide variety of potential faults, thereby increasing the likelihood of fabricating a 3D object that meets design specifications. Those potential faults may relate to process-voltage-temperature (PVT) variations, material composition inconsistencies, and unexpected heat transfer and/or cooling effects, among others. In addition, the robot system is capable of fabricating 3D objects with a much wider variety of geometries compared to conventional 3D printers, including geometries that include overhangs and geometries with complex branching structures.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for fabricating a three-dimensional (3D) object, the method comprising:
    causing, based on a first guide curve along which portions of material are to be deposited, a deposition tool to deposit a first portion of material proximate to a first target location included in the first guide curve, wherein the first guide curve has the first target location and a second target location;
    after the deposition tool deposits the first portion of material, determining a first distance between the first target location and a first deposition location corresponding to the first portion of material;
    generating, based on the first distance and the second target location, an updated second target location that replaces the second target location; and
    causing the deposition tool to deposit a second portion of material proximate to the updated second target location.

2. The computer-implemented method of claim 1, further comprising causing a robot that includes the deposition tool to alternatively deposit portions of material along the first guide curve and deposit portions of material along at least a second guide curve.

3. The computer-implemented method of claim 2, wherein generating the updated second target location based on the first distance comprises:
    computing, based on the first distance, a first vertex; and
    generating, based at least on the first vertex, a first tangent vertex, wherein the updated second target location is along the first tangent vertex.

4. The computer-implemented method of claim 1, further comprising generating the first guide curve by:
    processing a 3D model of the 3D object to determine at least one contour along a surface of the 3D object;
    determining a curve within the 3D model that is substantially parallel to the at least one contour; and
    generating, based on the curve, the first guide curve, wherein depositing portions of material along the first guide curve generates the at least one contour.

5. The computer-implemented method of claim 1, further comprising:
processing fabrication data to determine a third target location and a fourth target location;
causing the deposition tool to deposit a third portion of material proximate to the third target location; and
causing the deposition tool to deposit a fourth portion of material proximate to the fourth target location.

6. The computer-implemented method of claim 5, wherein:
the third target location is included within a second guide curve along which the deposition tool deposits material,
the fourth target location is included within a third guide curve along which the deposition tool deposits material, and
the second guide curve and the third guide curve correspond to branches of the 3D object.

7. The computer-implemented method of claim 1, wherein the updated second target location compensates for depositing the first portion of material the first distance from the first target location.

8. The computer-implemented method of claim 1, wherein determining the first distance comprises:
capturing sensor data when the first portion of material is deposited;
processing the sensor data to identify the first deposition location associated with the first portion of material;
transforming the first deposition location from a first coordinate frame to a second coordinate frame, wherein the second coordinate frame is associated with the first target location; and
determining the first distance based on the first target location within the second coordinate frame and the first deposition location within the second coordinate frame.

9. The computer-implemented method of claim 8, wherein the first coordinate frame is associated with an optical device that captures the sensor data and the second coordinate frame is associated with the 3D object.

10. One or more non-transitory computer-readable media that, when executed by one or more processors, causes the one or more processors to fabricate a three-dimensional (3D) object by performing the steps of:
causing, based on a first guide curve along which portions of material are to be deposited, a deposition tool to deposit a first portion of material proximate to a first target location included in the first guide curve, wherein the first guide curve has the first target location and a second target location;
after the deposition tool deposits the first portion of material, determining a first distance between the first target location and a first deposition location corresponding to the first portion of material;
generating, based on the first distance and the second target location, an updated second target location that replaces the second target location; and
causing the deposition tool to deposit a second portion of material proximate to the updated second target location.

11. The one or more non-transitory computer-readable media of claim 10, further comprising instructions that, when executed by the one or more processors, cause the one or more processors to perform the step of causing a robot that includes the deposition tool to alternatively deposit portions of material along the first guide curve and deposit portions of material along at least a second guide curve.

12. The one or more non-transitory computer-readable media of claim 11, wherein the step of generating the updated second target location based on the first distance comprises:
computing, based on the first distance, a first vertex; and
generating, based at least on the first vertex, a first tangent vertex, wherein the updated second target location is along the first tangent vertex.

13. The one or more non-transitory computer-readable media of claim 10, further comprising instructions that, when executed by the one or more processors, cause the one or more processors to perform the steps of generating the first guide curve by:
processing a 3D model of the 3D object to determine at least one contour along a surface of the 3D object;
determining a curve within the 3D model that is substantially parallel to the at least one contour; and
generating, based on the curve, the first guide curve, wherein depositing portions of material along the first guide curve generates the at least one contour.

14. The one or more non-transitory computer-readable media of claim 10, further comprising instructions that, when executed by the one or more processors, cause the one or more processors to perform the steps of:
processing fabrication data to determine a third target location and a fourth target location;
causing the deposition tool to deposit a third portion of material proximate to the third target location; and
causing the deposition tool to deposit a fourth portion of material proximate to the fourth target location.

15. The one or more non-transitory computer-readable media of claim 14, wherein:
the third target location is included within a second guide curve along which the deposition tool deposits material,
the fourth target location is included within a third guide curve along which the deposition tool deposits material, and
the second guide curve and the third guide curve correspond to branches of the 3D object.

16. The one or more non-transitory computer-readable media of claim 10, wherein the updated second target location compensates for depositing the first portion of material the first distance from the first target location.

17. The one or more non-transitory computer-readable media of claim 10, wherein the step of determining the first distance comprises:
capturing sensor data when the first portion of material is deposited;
processing the sensor data to identify the first deposition location associated with the first portion of material;
transforming the first deposition location from a first coordinate frame to a second coordinate frame, wherein the second coordinate frame is associated with the first target location; and
determining the first distance based on the first target location within the second coordinate frame and the first deposition location within the second coordinate frame.

18. The one or more non-transitory computer-readable media of claim 11, wherein the robot comprises a six-axis robotic arm.

19. A system, comprising:
a robot including a deposition tool;
a memory that includes a control application; and
a processor coupled to the memory and, upon executing the control application is configured to:

cause, based on a first guide curve along which portions of material are to be deposited, the deposition tool to deposit a first portion of material proximate to a first target location included in a the first guide curve, wherein the first guide curve has the first target location and a second target location;

after the deposition tool deposits the first portion of material, determining a first distance between the first target location and a first deposition location corresponding to the first portion of material;

generate, based on the first distance and the second target location, an updated second target location that replaces the second target location; and cause the deposition tool to deposit a second portion of material proximate to the updated second target location.

20. The system of claim 19, wherein the processor, upon executing the control application, is further configured to alternatively deposit portions of material along the first guide curve and deposit portions of material along at least a second guide curve.

* * * * *

UNITED STATES PATENT AND TRADEMARK OFFICE
CERTIFICATE OF CORRECTION

Page 1 of 1

PATENT NO.         : 10,579,046 B2
APPLICATION NO.    : 15/495944
DATED              : March 3, 2020
INVENTOR(S)        : Evan Atherton et al.

It is certified that error appears in the above-identified patent and that said Letters Patent is hereby corrected as shown below:

In the Claims

Column 21, Claim 19, Line 4, please delete "a".

Signed and Sealed this
Nineteenth Day of May, 2020

Andrei Iancu
*Director of the United States Patent and Trademark Office*